United States Patent
Gaurav et al.

(10) Patent No.: US 10,650,146 B1
(45) Date of Patent: May 12, 2020

(54) MALICIOUS SOFTWARE DETECTION

(71) Applicant: Cohesity, Inc., San Jose, CA (US)

(72) Inventors: Prashant Gaurav, Fremont, CA (US); Sidharth Mishra, Santa Clara, CA (US); Karandeep Singh Chawla, Santa Clara, CA (US); Anubhav Gupta, Sunnyvale, CA (US); Sudhir Srinivas, Cary, NC (US); Nagapramod Mandagere, Mountain View, CA (US); Apurv Gupta, Bangalore (IN)

(73) Assignee: Cohesity, Inc., San Jose, CA (US)

( * ) Notice: Subject to any disclaimer, the term of this patent is extended or adjusted under 35 U.S.C. 154(b) by 0 days.

(21) Appl. No.: 16/372,230

(22) Filed: Apr. 1, 2019

Related U.S. Application Data

(60) Provisional application No. 62/778,669, filed on Dec. 12, 2018.

(51) Int. Cl.
   *G06F 21/56* (2013.01)
   *G06F 16/23* (2019.01)
(52) U.S. Cl.
   CPC ........ *G06F 21/565* (2013.01); *G06F 16/2365* (2019.01)
(58) Field of Classification Search
   CPC .......................... G06F 21/565; G06F 16/2365
   See application file for complete search history.

(56) References Cited

U.S. PATENT DOCUMENTS

| | | | |
|---|---|---|---|
| 10,229,269 B1* | 3/2019 | Patton | G06F 21/566 |
| 2014/0007239 A1* | 1/2014 | Sharpe | G06F 21/561 |
| | | | 726/24 |
| 2016/0378988 A1* | 12/2016 | Bhashkar | G06F 21/566 |
| | | | 726/24 |
| 2017/0279615 A1* | 9/2017 | Naik | H04L 9/3247 |
| 2019/0108341 A1* | 4/2019 | Bedhapudi | G06F 21/566 |

* cited by examiner

*Primary Examiner* — Harunur Rashid
(74) *Attorney, Agent, or Firm* — Van Pelt, Yi & James LLP

(57) ABSTRACT

An amount of data change associated with a version of a content file with respect to one or more previous versions of the content file is determined. The amount of change associated with the version of the content file is determined using a tree data structure associated with the content file that is stored on a storage cluster. One or more statistics associated with backup snapshot are provided to a server. The server is configured to determine that the amount of data change associated with the version of the content file is anomalous based in part on the one or more statistics associated with the backup snapshot. A notification that data associated with the backup snapshot is potentially infected by malicious software is received from the server. The version of the content file is indicated as being potentially infected by malicious software.

19 Claims, 21 Drawing Sheets

MALICIOUS SOFTWARE DETECTION

CROSS REFERENCE TO OTHER APPLICATIONS

This application claims priority to U.S. Provisional Patent Application No. 62/778,669 entitled MALICIOUS SOFTWARE DETECTION filed Dec. 12, 2018 which is incorporated herein by reference for all purposes.

BACKGROUND OF THE INVENTION

Ransomware is a type of malicious software designed to deny access to a computer system or files until a ransom is paid. One form of ransomware is encrypting ransomware, which encrypts files stored on a system. The encrypted files will not be decrypted unless the ransom is paid. Cyber attackers typically attempt to deploy ransomware on the enterprise computing systems. Computing systems infected with ransomware may cause an enterprise to lose time, data, and/or money.

BRIEF DESCRIPTION OF THE DRAWINGS

Various embodiments of the invention are disclosed in the following detailed description and the accompanying drawings.

DETAILED DESCRIPTION

Figure 1A:
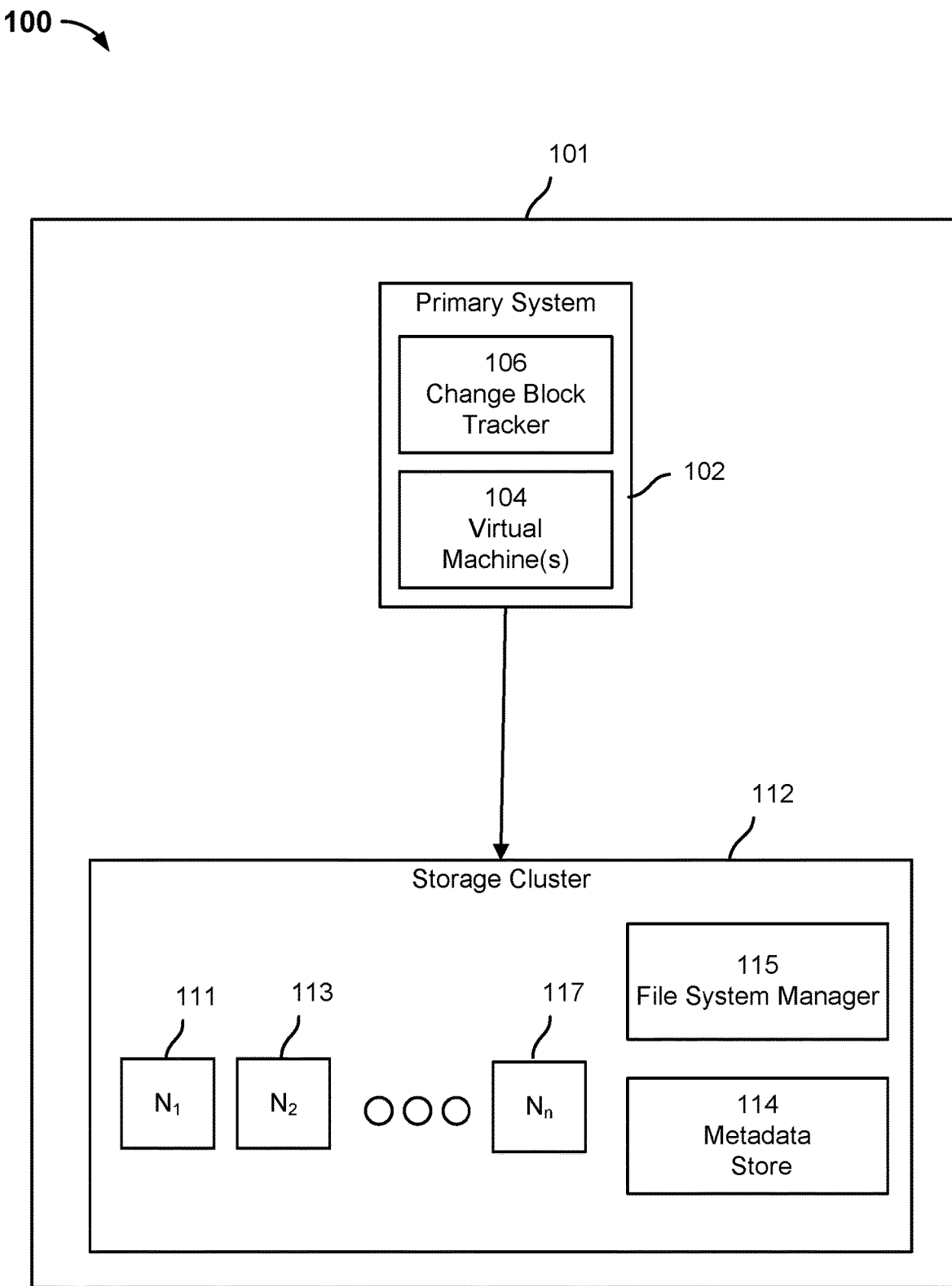
FIG. 1A is a block diagram illustrating an embodiment of a system for detecting malicious software.

A primary system is comprised of file system data. The file system data includes a plurality of files (e.g., content files, text files, etc.) and metadata associated with the plurality of files. A storage cluster may cause the primary system to perform a backup snapshot of the file system data according to a backup policy and send the backup snapshot to the storage cluster. A backup snapshot may represent the state of the primary system at a particular point in time (e.g., the state of the file system data). The backup snapshot policy may require a full backup snapshot or an incremental backup snapshot to be performed. A full backup snapshot includes the entire state of the primary system at a particular point in time. An incremental backup snapshot includes the state of the primary system that has changed since a last backup snapshot.

A portion of or the entire primary system may have been infected with malicious software in between backup snapshots. For example, ransomware is a type of malicious software designed to deny access to one or more files until a ransom is paid. The malicious software may encrypt one or more files of the primary system such that a user associated with the primary system is unable to access the one or more files because the user does not possess the key to decrypt the encrypted files.

The primary system may initially perform a full backup snapshot and perform a plurality of incremental backup snapshots after the full backup snapshot. The primary system may perform one or more backup snapshots after the primary system has been infected with malicious software. The primary system may include a change block tracker that monitors and identifies one or more data blocks of the primary system that have changed (e.g., modified, deleted, added) since the last backup snapshot. The primary system may be configured to provide to a storage cluster the one or more identified data blocks when performing an incremental backup snapshot. The malicious software may cause portions of a file to become encrypted, i.e., modified. The data blocks associated with the encrypted portions may be included in the incremental backup snapshot because those data blocks were not backed up in a previous backup snapshot even though the unencrypted versions of those data blocks were previously backed up.

A storage cluster may ingest and store the file system data of the backup snapshot across a plurality of storage nodes of the storage cluster. A file system manager of the storage cluster may organize the file system data of the backup snapshot using a tree data structure. An example of the tree data structure is a file system metadata snapshot tree (e.g., Cohesity Snaptree®), which may be based on a B+ tree structure (or other type of tree structure in other embodiments). The tree data structure may provide a view of the file system data corresponding to a backup snapshot. The view of the file system data corresponding to the backup snapshot may be comprised of a file system metadata snapshot tree and one or more file metadata trees. A file metadata tree may correspond to one of the files included in the backup snapshot. The file metadata tree is a snapshot structure that stores the metadata associated with the file. For example, a file metadata tree may correspond to a virtual machine container file (e.g., virtual machine image file, virtual machine disk file, etc.). Thus, the file metadata tree may store the metadata associated with a virtual machine container file.

Regardless if the view of the file system data corresponds to a full backup snapshot or an incremental backup snapshot, the view of the file system data corresponding to the backup snapshot provides a fully hydrated backup snapshot that provides a complete view of the primary system at a moment in time corresponding to when the backup snapshot was performed. The view of file system data may allow any file that was stored on the primary system at the time the corresponding backup snapshot was performed, to be retrieved, restored, or replicated.

A file system metadata snapshot tree may include a root node, one or more levels of one or more intermediate nodes associated with the root node, and one or more leaf nodes associated with an intermediate node of the lowest intermediate level. The root node of a file system metadata snapshot tree may include one or more pointers to one or more intermediate nodes. The root node may correspond to a particular backup snapshot of file system data. Each intermediate node may include one or more pointers to other nodes (e.g., a lower intermediate node or a leaf node). A leaf node of the file system metadata snapshot tree may store data associated with a file for a file with data that is smaller than a limit size (e.g., 256 kB). A leaf node may be an index node (inode). A leaf node of the snapshot tree may store a pointer to a file metadata tree for a file with data that is greater than or equal to the limit size. The file metadata tree is a snapshot structure and is configured to store the metadata associated with a file. The file may correspond to a virtual machine container file. Thus, a file metadata tree may be used to represent an entire virtual machine.

A file metadata tree may include a root node, one or more levels of one or more intermediate nodes associated with the root node, and one or more leaf nodes associated with an intermediate node of the lowest intermediate level. A file metadata tree is similar to a file system metadata snapshot tree, but a leaf node of a file metadata tree may include an identifier of a data brick associated with one or more data chunks of the file or a pointer to the data brick associated with one or more data chunks of the file. A data brick may include one or more data chunks. A data brick may be associated with one or more chunk identifiers (e.g., SHA-1). A chunk metadata table may store information that associates a brick identifier with one or more chunk identifiers and one or more chunk file identifiers. A chunk file metadata table may associate a chunk file identifier with a chunk file storing a plurality of data chunks. The chunk metadata table and the chunk file metadata table may be used, based on a brick identifier, to locate the data chunks associated with the file corresponding to the file metadata tree.

In some embodiments, data included in a backup snapshot is determined to have been potentially infected with malicious software based on the total amount of data included in a backup snapshot. The file system metadata snapshot tree associated with the backup snapshot may include one or more references to data associated with one or more previous backup snapshots and one or more references to data associated with the backup snapshot. The file system metadata snapshot tree associated with the backup snapshot may be traversed to determine a total amount of data that was added since a previous backup snapshot. An incremental backup snapshot with a large amount of data may indicate that the primary system was infected with malicious software because the malicious software may encrypt portions of the primary system. For an incremental backup snapshot, the primary system is configured to send the data that was previously not backed up. Since the last backup snapshot, data that was previously backed up may be encrypted. The encrypted data portions may be included in an incremental backup snapshot because the encrypted data portions were not previously backed up. The amount of data that was included in the backup snapshot may be compared to one or more previous backup snapshots to determine whether the backup snapshot includes data that was potentially infected with malicious software. For example, the total amount of data included in the backup snapshot may be compared to an average amount of data included in a plurality of backup snapshots.

In some embodiments, a version of a file (e.g., version of a file backed up from a primary system or a version of a file generated by a storage cluster) is determined to have been potentially infected with malicious software by comparing the file metadata trees associated with a file. The file metadata trees may correspond to different versions of a file. For an incremental backup snapshot, a primary system may be configured to send one or more data blocks associated with a file that have not been previously backed up. In the event a file is infected with malicious software, portions of or the entire file may be encrypted. The change block tracker of the primary system may treat the encrypted portions of the infected file as data blocks that have not been previously backed up and the primary system may be configured to back up the encrypted data blocks to the storage cluster. The storage cluster may be configured to receive the encrypted data blocks and to update the file metadata tree associated with the infected file. A file may be determined to have been infected with malicious software by comparing the file metadata trees associated with the file and determining the amount of data associated with the file that has changed between backup snapshots (i.e., the amount of data that has changed with versions of the file).

In some embodiments, a rate at which the file has changed over a plurality of backup snapshots may be determined and compared to determine whether a file has been potentially infected with malicious software. For example, a particular file may normally exhibit a less than 5% change per backup snapshot over the ten backup snapshots before the last backup snapshot. However, for the last backup snapshot, the particular file may have exhibited a 50% change. Such an increase of the rate at which the file has changed may indicate that the file has been infected by malicious software.

In other embodiments, the total amount of deduplication associated with a backup snapshot is determined. Variable data chunk size (e.g., 4 kB to 64 kb) may be used to increase the amount of deduplication. A backup snapshot where a small amount or percentage of the data is deduplicated (e.g., less than 5%) may indicate that the data included in the backup snapshot has been potentially infected with malicious software because data that is unable to be deduplicated may indicate that the data is encrypted. Malicious software may encrypt file system data of the primary system to prevent a user associated with the primary system from accessing some or all of the file system data. In the event variable data chunk sizes are used and a small amount or percentage of the data is deduplicated, the data included in the backup snapshot may have been potentially infected with malicious software.

In other embodiments, the amount of deduplication associated with a file included in the backup snapshot is determined. A file may undergo a large amount of change since a previous backup snapshot. The portions of the file that have changed may be analyzed to determine whether deduplication has occurred with respect to the changed portion. For example, a leaf node associated with a file metadata tree corresponding to the file may include a pointer to or an identifier of a data brick that is shared by another file (i.e., a leaf node associated with a second file metadata tree corresponding to a second file includes a pointer to the data brick.). In the event deduplication was not possible for some or all of the changed portion, the file may be indicated (e.g., flagged) as being potentially infected with malicious software because this may indicate that the data chunks associated with the changed portion are encrypted. In the event deduplication is possible for some of the changed portion, the file may be determined to have not been infected with malicious software because this may indicate that the data chunks associated with the changed portion are not encrypted.

In other embodiments, a rate at which particular portions of a file have changed over a plurality of backup snapshots may be compared to determine whether a file has been potentially infected with malicious software. For example, particular portions of a file (e.g., file permissions, file name) normally do not change between backup snapshots. However, a file infected with malicious software may be likely to have those portions of the file modified between backup snapshots. The file metadata trees associated with a file may be compared to determine a rate at which portions of the file change per backup snapshots. In the event a particular portion of a file experiences a high amount of change (e.g., 50%) for a particular backup snapshot, but normally experiences a low amount of change (e.g., 5%) per backup snapshot, the file may be indicated (e.g., flagged) as being potentially infected with malicious software.

Other factors, such as historical trends and seasonality may be taken into consideration before determining that a file may have been infected with malicious software. For example, some files, such as tax return files, may be expected to experience a large amount of change during certain parts of the year (e.g., between January and April), but not be expected to experience large amounts of change during the other parts of the year (e.g., between May and December). In the event the large amount of change occurred during the expected duration, the data changes may be dismissed as a possible malicious software infection.

In some embodiments, by detecting malicious software from information which has already been stored in the storage cluster, the associated analysis does not introduce a delayed ingest of the backup data. In some embodiments, by detecting the malicious software from the backup responsive to receiving another backup snapshot instead of screening the backup at the time of restore, a restore action is not delayed. In other embodiments, by detecting the malicious software in a regularly scheduled mode instead of screening the backup at the time of restore, a restore action is not delayed.

In other embodiments, the storage cluster is configured to ingest from the primary system the backup snapshot and determine one or more statistics associated with the data included in the backup snapshot while the backup snapshot is being ingested. In some embodiments, one or more files included in the backup snapshot, and by extension, the backup snapshot itself, may be determined to be potentially infected with malicious software based on one or more statistics associated with the data included in the backup snapshot.

In some embodiments, the one or more statistics associated with the data included in the backup snapshot include the total amount of data that was included in the backup snapshot. Malicious software may encrypt file system data of the primary system. When the primary system performs an incremental backup snapshot, the encrypted file system data may be included in the incremental backup snapshot because the encrypted file system data was not previously backed up. Large variations (e.g., greater than a first variation threshold) in the total amount of data that was included in the backup snapshot may indicate that the primary system was potentially infected with malicious software.

In other embodiments, the one or more statistics associated with the data included in the backup snapshot include the total amount of data associated with a particular file included in the backup snapshot. Malicious software may encrypt portions of or an entire file. When the primary system performs an incremental backup snapshot, the encrypted portions of the file may be included in the incremental backup snapshot because they were not previously backed up. Large variations (e.g., greater than a first variation threshold) in the total amount of data associated with a particular file that was included in the backup snapshot may indicate that the particular file, and by extension the primary system, was potentially infected with malicious software.

In other embodiments, the one or more statistics associated with the data included in the backup snapshot include the total amount of deduplication associated with the data included in the backup snapshot. Variable data chunk size (e.g., 4 kB to 64 kb) may be used to increase the amount of deduplication. A backup snapshot where a small amount of the data is deduplicated may indicate that the backup snapshot has been potentially infected with malicious software because data that is unable to be deduplicated may indicate that the data is encrypted. When the primary system performs an incremental backup snapshot, the encrypted portions of the file may be included in the incremental backup snapshot because they were not previously backed up. Data that is unable to be deduped because it is encrypted may indicate that the primary system has been potentially infected with malicious software because data that has been infected with malicious software is usually encrypted and unable to be deduped. In the event variable data chunk sizes are used and a small amount or percentage of the data is deduplicated, the data included in the backup snapshot may have been potentially infected with malicious software.

In other embodiments, the one or more statistics associated with the data included in the backup snapshot include determining the amount of deduplication associated with a file included in the backup snapshot. A file may undergo a large amount of change since a previous backup snapshot. The portions of the file that have changed may be analyzed to determine whether deduplication has occurred with respect to the changed portion. Data that is unable to be deduped because it is encrypted may indicate that the file, and by extension the primary system, has been potentially infected with malicious software because data that has been infected with malicious software is usually encrypted and unable to be deduped.

In other embodiments, the one or more statistics associated with the data included in the backup snapshot include a number of files included in the backup snapshot that were added, deleted, and/or modified. The number of files included in the backup snapshot that were added, deleted, and/or modified may be compared to a change threshold. In the event the number of files included in the backup snapshot that were added, deleted, and/or modified is greater than the change threshold, the changed files associated with the backup snapshot may be determined to have been potentially infected with malicious software.

In other embodiments, the one or more statistics associated with the data included in the backup snapshot include an entropy of the changed data. The entropy of the changed data may be a measure of randomness associated with a file. An amount of compression associated with a file may be used to indirectly measure the entropy of the changed data associated with the file. In some embodiments, for systems that maintain fine-grained pre/post compression and pre/post deduplication statistics, entropy may be inferred from fine-grained pre/post compression and pre/post deduplication statistics. In some embodiments, for systems that do not maintain fine-grained pre/post compression and pre/post deduplication statistics, entropy may be inferred from compression statistics associated with a sample of the data chunks associated with the changed data. Compression statistics associated with a sample of the data chunks of the changed data may be determined. Unique data chunks (e.g., non-deduped data chunks) may be sampled. The unique data chunks of the changed data may be randomly sampled or sampled using one or more different sampling techniques. In the event the sampled changed data compresses more than a compression threshold, the changed data associated with the file may be determined to be less random, which indicates the entropy of the changed data is small (e.g., less than an entropy threshold). In the event the sampled changed data compresses less than the compression threshold, i.e., the entropy of the changed data associated with a file is greater than an entropy threshold, the file may be determined to have been potentially infected with malicious software.

The one or more statistics associated with data included in the backup snapshot may be provided from the storage cluster to an analysis server associated with a cloud service system that is hosted in a cloud environment. In some embodiments, the analysis server is configured to determine whether a backup snapshot has been potentially infected with malicious software based on the one or more statistics associated with the data included in the backup snapshot.

For example, the analysis server may determine whether data included in the backup snapshot has been potentially infected with malicious software based on the rate of change per backup snapshot. The total amount of data change for the backup snapshot may be compared to the rate of change associated with one or more previous backup snapshots.

In some embodiments, the analysis server is configured to determine whether data included in the backup snapshot has been potentially infected with malicious software based on the rate of change of a particular file per backup snapshot. The total amount of data change of a particular file for the backup snapshot may be compared to the rate of change for the particular file associated with one or more previous backup snapshots. In other embodiments, the analysis server is configured to determine whether data included in the backup snapshot has been potentially infected with malicious software based on an amount of deduplication associated with the data included in the backup snapshot. In other embodiments, the analysis server is configured to determine whether data included in the backup snapshot has been potentially infected with malicious software based on an amount of deduplication associated with a file included in the backup snapshot.

In other embodiments, the analysis server is configured to determine whether data included in the backup snapshot has been potentially infected with malicious software based on the rate at which particular portions of a file have changed over a plurality of backup snapshots. Malicious software may attempt to change filenames and/or permissions. By inspecting the data chunks instead of just the file names and/or permissions, malicious software that might otherwise not be detected because filenames and/or permissions do not change while other portions change may be detected.

In some embodiments, the analysis server is configured to determine whether data included in the backup snapshot has been potentially infected with malicious software based on the number of files included in the backup snapshot that were added, deleted, and/or modified. In some embodiments, the analysis server is configured to determine whether data included in the backup snapshot has been potentially infected with malicious software based on an entropy of the changed data. The analysis server may consider other factors, such as historical trends and seasonality, before determining that a file and/or a primary system may have been infected with malicious software.

Using a single statistic associated with data included in a backup snapshot to determine whether a file stored on the primary system or the actual primary system is potentially infected with malicious software may lead to a plurality of false positives (e.g., determine the file or the primary system is potentially infected with malicious software when the file or the primary system is not infected with malicious software). The number of false positives detected by the analysis server may be reduced by using a plurality of the statistics associated with the backup snapshot. For example, an amount of deduplication associated with a backup snapshot may be determined. In the event the amount of deduplication associated with the backup snapshot is greater than a deduplication threshold, the number of files included in a backup snapshot that were added, deleted, or modified may be determined. In the event the number of files included in a backup snapshot that were added, deleted, or modified is greater than a change threshold, an entropy of the changed data associated with the files included in the backup snapshot may be determined. In the event the entropy of the changed data associated with the files included in the backup snapshot is greater than an entropy threshold, one or more files included in the backup snapshot may be determined to be potentially infected with malicious software.

The analysis server may provide a notification to the storage cluster. In other embodiments, the analysis server provides a notification to the primary system. The notification may indicate that data included in the backup snapshot has been potentially infected with malicious software. In some embodiments, in response to receiving the notification from the analysis server, the storage cluster is configured to provide a notification to a user associated with the primary system. In other embodiments, upon detecting that a version of a file may have been infected with malicious software, the storage cluster is configured to provide a notification to a user associated with the primary system. The notification provided to the user associated with the primary system may indicate that a file, and by extension the primary system, have been infected with malicious software. The notification provided to the user associated with the primary system may indicate that portions of or the entire file system data of the primary system has been infected with malicious software. The notification may also provide a link to a set of one or more clean backup snapshots (e.g., a backup snapshot that has not been infected with malicious software). In other embodiments, the notification provides a link to a set of one or more clean backup file versions (e.g., a version of the file that has not been infected with malicious software). A backup snapshot may be determined to be a clean backup snapshot in the event the backup snapshot does not include the data chunks that indicate a file has been infected with malicious software. A version of a file may be determined to be a clean backup file in the event the backup snapshot associated with the clean file does not include the data chunks that indicate the file has been infected with malicious software. Upon receiving a selection from the user, the storage cluster is configured to restore the file and/or the primary system to the state associated with the selected clean file version/backup snapshot.

By analyzing using the processors on the storage cluster and the analysis server of the cloud service system, the resources of the primary system are not taxed and are preserved for their primary usage, providing the benefits of monitoring without consuming additional resources on the primary system.

FIG. 1A is a block diagram illustrating an embodiment of a system for detecting malicious software. In the example shown, system 100 includes datacenter 101 comprising primary system 102 and storage cluster 112. Although datacenter 101 depicts primary system 102 coupled to storage cluster 112, primary system 102 may be coupled to one or more other storage clusters (not shown).

Primary system 102 is a computing system that stores file system data. The file system data may be stored across one or more object(s), virtual machine(s), physical entity/entities, file system(s), array backup(s), and/or volume(s) of the primary system 102. The file system data may include one or more files (e.g., content files, text files). Primary system 102 may be comprised of one or more servers, one or more computing devices, one or more storage devices, and/or a combination thereof.

Primary system 102 may include one or more virtual machines 104. A virtual machine may be stored as one or more container files (e.g., virtual machine image file, virtual machine disk file, etc.). The virtual machine container file includes a plurality of virtual machine content files of the virtual machine and metadata associated with the plurality of virtual machine content files.

Primary system 102 may include change block tracker 106. The file system data stored on primary system 102 is comprised of one or more data blocks. Change block tracker 106 may be configured to monitor the one or more data blocks and store an indication of when one of the one or more data blocks has been modified. Change block tracker 106 may receive one or more data blocks associated with one or more files in route to being stored in one or more object(s), virtual machine(s), physical entity/entities, file system(s), array backup(s), and/or volume(s) of primary system 102. A change block tracker is configured to maintain a map of the one or more changes to the file system data. The map may include the one or more data blocks that were changed, the values associated with the one or more changed data blocks, and an associated timestamp. In the event primary system 102 performs a backup snapshot (either full or incremental), change block tracker 106 may be configured to clear (e.g., empty) the map of the one or more data blocks that have been modified.

Primary system 102 may be configured to backup file system data to storage cluster 112 according to one or more backup policies associated with storage cluster 112. Storage cluster 112 may be a secondary storage system for primary system 102. In other embodiments, primary system 102 is configured to backup file system data to one or more other storage clusters (not shown) according to one or more backup policies associated with the one or more other storage clusters. Storage cluster 112 may provide a command to primary system 102 that causes primary system 102 to perform a backup snapshot. The file system data may include the one or more virtual machine container files corresponding to the one or more virtual machines 104. In some embodiments, a backup policy indicates that file system data is to be backed up on a periodic basis (e.g., hourly, daily, weekly, monthly, etc.). In other embodiments, a backup policy indicates that file system data is to be backed up when a threshold size of data has changed. In other embodiments, a backup policy indicates that file system data is to be backed up upon a command from a user associated with primary system 102. The backup policy may indicate when a full backup snapshot is to be performed and when an incremental backup snapshot is to be performed. For example, the backup policy may indicate that a full backup snapshot is to be performed according to a first schedule (e.g., weekly, monthly, etc.) and an incremental backup snapshot is to be performed according to a second schedule (e.g., hourly, daily, weekly, etc.) The backup policy may indicate that a full backup snapshot is to be performed after a threshold number of incremental backup snapshots have been performed.

Storage cluster 112 is a storage system configured to ingest and store file system data received from primary storage system 102. Storage cluster 112 may be comprised of one or more storage nodes 111, 113, 117. Each storage node may have its own corresponding processor. The one or more storage nodes may be one or more solid state drives, one or more hard disk drives, or a combination thereof. The file system data included in a backup snapshot may be stored in one or more of the storage nodes 111, 113, 117. In some embodiments, the corresponding processor associated with a storage node is configured to determine a corresponding amount of data change per backup snapshot for the storage node. A cumulative amount of data change per backup snapshot may be determined based on the corresponding amounts of data change per backup snapshot for the plurality of storage nodes. In one embodiment, storage cluster 112 is comprised of one solid state drive and three hard disk drives. One or more of the storage nodes 111, 113, 117, alone or in combination, may act as an analysis server.

Storage cluster 112 may include file system manager 115. File system manager 115 may be running on one or more of the storage nodes 111, 113, 117. File system manager 115 may be configured to organize in a tree data structure the file system data received in a backup snapshot from primary system 102. An example of the tree data structure is a file system metadata snapshot tree (e.g., Cohesity Snaptree®), which may be based on a B+ tree structure (or other type of tree structure in other embodiments). The tree data structure may provide a view of the file system data corresponding to a backup snapshot. The view of the file system data corresponding to the backup snapshot may be comprised of a file system metadata snapshot tree and a plurality of file metadata trees. A file metadata tree may correspond to one of the files included in the backup snapshot. The file metadata tree is a snapshot structure that stores the metadata associated with the file. For example, a file metadata tree may correspond to a virtual machine container file (e.g., virtual machine image file, virtual machine disk file, etc.). Thus, the file metadata tree may store virtual machine file system metadata. File system manager 115 may be configured to perform one or more modifications, as disclosed herein, to a file system metadata snapshot tree. The snapshot trees and file metadata trees may be stored in metadata store 114. The metadata store 114 may store the view of file system data corresponding to a backup snapshot. The metadata store may also store data associated with content files that are smaller than a limit size.

The tree data structure may be used to capture different versions of backup snapshots. The tree data structure may allow a chain of file system metadata snapshot trees corresponding to different versions of backup snapshots (i.e., different file system metadata snapshot tree versions) to be linked together by allowing a node of a later version of a file system metadata snapshot tree to reference a node of a previous version of a file system metadata snapshot tree (e.g., a "file system metadata snapshot tree forest"). For example, a root node or an intermediate node of a second file system metadata snapshot tree corresponding to a second backup snapshot may reference an intermediate node or leaf node of a first file system metadata snapshot tree corresponding to a first backup snapshot.

A file system metadata snapshot tree may include a root node, one or more levels of one or more intermediate nodes associated with the root node, and one or more leaf nodes associated with an intermediate node of the lowest intermediate level. The root node of a file system metadata snapshot tree may include one or more pointers to one or more intermediate nodes. Each intermediate node may include one or more pointers to other nodes (e.g., a lower intermediate node or a leaf node). A leaf node may store file system metadata, data associated with a file that is less than a limit size, an identifier of a data brick, a pointer to a file metadata tree (e.g., Blob structure), or a pointer to a data chunk stored on the storage cluster.

Data associated with a file that is smaller than or equal to a limit size (e.g., 256 kB) may be stored in a leaf node of the file system metadata snapshot tree. A leaf node may be an inode. A file metadata tree may be generated for a file that is larger than the limit size. The file metadata tree is a snapshot structure and may be configured to store the metadata associated with a version of a file (e.g., version of a file backed up from a primary system or a version of a file generated by a storage cluster). The file may correspond to a virtual machine container file (e.g., virtual machine image file, virtual machine disk file, etc.). Thus, a file metadata tree may be used to represent an entire virtual machine.

The file metadata tree may include a root node, one or more levels of one or more intermediate nodes associated with the root node, and one or more leaf nodes associated with an intermediate node of the lowest intermediate level. The tree data structure associated with a file metadata tree may allow a chain of file metadata trees corresponding to different versions of a file to be linked together by allowing a node of a later version of a file metadata tree to reference a node of a previous version of a file metadata tree. For example, a root node or an intermediate node of a second file metadata tree corresponding to a second version of a file may reference an intermediate node or leaf node of a first file metadata tree corresponding to a first version of the file.

A leaf node of a file metadata tree may include an identifier of a data brick associated with one or more data chunks of the file or a pointer to the data brick associated with one or more data chunks of the file. For example, a file metadata tree may correspond to a virtual machine container file and a leaf node of the file metadata tree may include a pointer to or an identifier of a data brick associated with one or more data chunks of the virtual machine container file. A data brick may include one or more data chunks.

In some embodiments, the size of a brick is 256 kB. The data brick may be associated with one or more data chunks. The one or more data chunks may be of variable length within a particular range (e.g., 4 kB to 64 kB).

The location of the one or more chunks associated with a data brick may be identified using a data structure (e.g., list, table, etc.) stored in a metadata store. For example, a data brick may be associated with one or more chunk identifiers (e.g., SHA-1) and the data structure (e.g., chunk metadata table) may store information that associates a brick identifier with one or more chunk identifiers and one or more chunk file identifiers. A chunk file identifier may be associated with a chunk file that stores a plurality of data chunks. A second data structure (e.g., chunk file metadata table) may associate a chunk file identifier with a chunk file storing a plurality of data chunks. The chunk metadata table and the chunk file metadata table may be used, based on a brick identifier, to locate the data chunks associated with the file corresponding to the file metadata tree.

In some embodiments, storage cluster 112 is configured to back up a plurality of files stored on a primary system and generate a corresponding file metadata tree for each of the plurality of files. In other embodiments, storage cluster 112 is configured to store a plurality of files generated by a user associated with storage cluster 112 and generate a corresponding file metadata tree for each of the plurality of files. Regardless of whether a file was generated by primary system 102 or by storage cluster 112, the file metadata tree corresponding to the file may be analyzed by an analysis server (e.g., either one of the storage nodes of storage cluster 112 or analysis server 172) to determine whether the file has been potentially infected with malicious software.

A version of a file (e.g., version of a file backed up from a primary system or a version of a file generated by a storage cluster) may be determined to have been potentially infected with malicious software by comparing the file metadata trees associated with a file. In some embodiments, the malicious software is ransomware. Each file metadata tree may correspond to a particular version of the file. For an incremental backup snapshot, primary system 102 may be configured to send one or more data blocks associated with a file that have not been previously backed up. In the event a file is infected with malicious software, portions of or the entire file may be encrypted. Change block tracker 106 may be configured to treat the encrypted portions of the infected file as data blocks that have not been previously backed up and primary system 102 is configured to back up the encrypted data blocks to storage cluster 112. Storage cluster 112 may be configured to receive the encrypted data chunks and to update the file metadata tree associated with the infected file. A file may be determined to have been infected with malicious software by comparing the file metadata trees associated with the file and determining the amount of data associated with the file that has changed per backup snapshot.

In some embodiments, the amount of data included in a particular backup snapshot is compared to a historical amount (e.g., average, moving average) of data included in one or more previous backup snapshots. For example, the amount of data included in a backup snapshot may fluctuate per backup snapshot. The average amount of data included in a backup snapshot may be determined. File system manager 115 may compare the amount of data included in the particular backup snapshot to the average amount of data included per backup snapshot. In the event the amount of data included in the particular backup snapshot is greater than the historical amount by a threshold (e.g., certain amount, certain percentage, more than one standard deviation, any other statistical measure), file system manager 115 may indicate (e.g., flag) the data included in the particular backup snapshot as being potentially infected by malicious software.

In some embodiments, a rate at which a file has changed over a plurality of backup snapshots may be compared to determine whether a file has been infected with malicious software. File system manager 115 may be configured to analyze the file metadata tree associated with a file and determine the amount of data associated with the file that has changed per backup snapshot by traversing the file metadata trees associated with the file.

The rate at which the data associated with a file has changed for a backup snapshot may be compared to a historical rate (e.g., average, moving average) at which the data associated with the file has changed. For example, the amount of change associated with a file may fluctuate at any time of the year. The average rate of change per backup snapshot for the file may be determined. File system manager 115 may compare the rate at which the file has changed for a particular backup snapshot to the average rate of change per backup snapshot. In the event the rate at which the data associated with the file has changed for a particular backup snapshot is greater than the historical rate of change by a threshold (e.g., certain amount, certain percentage, more than one standard deviation, any other statistical measure), file system manager 115 may indicate (e.g., flag) the file as being potentially infected by malicious software.

The rate at which the data associated with a particular file has changed for a particular backup snapshot may be compared to a seasonality rate at which the data associated with the particular file has changed. For example, the amount of change associated with a file may fluctuate based on a particular time of year. File system manager 115 may compare the rate at which the file has changed for a particular backup snapshot to an expected rate of change for the particular time of year. In the event the rate at which the data associated with the file has changed for a particular backup snapshot is greater than the expected rate of change for the particular time of year by a threshold (e.g., certain amount, certain percentage, more than one standard deviation, any other statistical measure), file system manager 115 may indicate the file as being potentially infected by malicious software.

The rate at which the data associated with a particular file has changed for a particular backup snapshot may be compared to a trending rate at which the data associated with the particular file has changed. For example, the amount of change associated with a file may have increased over a particular time period (e.g., the last two weeks). File system manager 115 may compare the rate at which the file has changed for a particular backup snapshot to the trending rate for the particular time period. In the event the rate at which the data associated with the file has changed for a particular backup snapshot is greater than the trending rate for the particular time period by a threshold (e.g., certain amount, certain percentage, more than one standard deviation, any other statistical measure), file system manager 115 may indicate the file as being potentially infected by malicious software.

In other embodiments, the amount of deduplication that occurs per backup snapshot is determined. A file may undergo a large amount of change since a last backup snapshot. File system manager 115 may analyze the portions of the file that have changed to determine whether deduplication has occurred with respect to the changed portion. For example, a leaf node associated with a file metadata tree may include a pointer to a data brick that is shared by another file (i.e., a leaf node associated with a second file metadata tree corresponding to a second file includes a pointer to the data brick). In the event deduplication was not possible for some of the changed portion, file system manager 115 may indicate the file as being potentially infected with malicious software because this indicates that the data chunks associated with the changed portion are encrypted. In the event deduplication is possible for some of the changed portion, the file may be determined to have not been infected with malicious software because this indicates that the data chunks associated with the changed portion are not encrypted.

In other embodiments, file system manager 115 may analyze specific portions of a file. For example, particular portions of a file (e.g., file permissions, file name) normally do not change between backup snapshots. However, a file infected with malicious software may be likely to have those portions of the file modified. File system manager 115 may analyze the rate of change associated with specific portions of a file to determine whether the file has been potentially infected with malicious software. File system manager 115 may traverse the file metadata trees associated with the file to determine whether a sub-portion of the file metadata tree has experienced an abnormal amount of change. In the event the rate at which a particular portion of the file has changed for a particular backup snapshot is greater than the historical rate of change per backup snapshot (e.g., average, moving average) by a threshold (e.g., certain amount, certain percentage, more than one standard deviation, any other statistical measure), file system manager 115 may indicate the file as being potentially infected by malicious software. In the event the rate at which a particular portion of the file has changed for a particular backup snapshot is greater than a seasonality rate by a threshold (e.g., certain amount, certain percentage, more than one standard deviation, any other statistical measure), file system manager 115 may indicate the file as being potentially infected by malicious software. In the event the rate at which the particular portion of the file has changed for a particular backup snapshot is greater than the trending rate for the particular time period by a threshold (e.g., certain amount, certain percentage, more than one standard deviation, any other statistical measure), file system manager 115 may indicate the file as being potentially infected by malicious software.

File system manager 115 may determine the number of files included in the backup snapshot that were added, deleted, and/or modified. The number of files included in the backup snapshot that were added, deleted, and/or modified may be compared to a change threshold. In the event the number of files included in the backup snapshot that were added, deleted, and/or modified is greater than the change threshold, the changed files associated with the backup snapshot may be determined to have been potentially infected with malicious software.

File system manager 115 may determine an entropy of the changed data. The entropy of the changed data may be a measure of randomness associated with a file. An amount of compression associated with a file may be used to indirectly measure the entropy of the changed data associated with the file. In some embodiments, for systems that maintain fine-grained pre/post compression and pre/post deduplication statistics, entropy may be inferred from fine-grained pre/post compression and pre/post deduplication statistics. In some embodiments, for systems that do maintain fine-grained pre/post compression and pre/post deduplication statistics, entropy may be inferred from compression statistics associated with a sample of the data chunks associated with the changed data. Compression statistics associated with a sample of the data chunks of the changed data may be determined. Unique data chunks (e.g., non-deduped data chunks) may be sampled. The unique data chunks of the changed data may be randomly sampled or sampled using one or more different sampling techniques. In the event the sampled changed data compresses more than a compression threshold, the changed data associated with the file may be determined to be less random, which indicates the entropy of the changed data is small (e.g., less than an entropy threshold). In the event the sampled changed data compresses less than the compression threshold, i.e., the entropy of the changed data associated with a file is greater than an entropy threshold, the file may be determined to have been potentially infected with malicious software.

File system manager 115 may consider other factors, such as trends and seasonality, before determining that a file may have been infected with malicious software. For example, the rate of data change associated with a particular snapshot may be abnormal when compared to the historical rate of data change, but within the normal amounts of change when taking a trend rate and/or seasonality rate into consideration. Some files, such as tax return files may be expected to experience a large amount of change during certain parts of the year (e.g., between January and April), but not be expected to experience large amounts of change during the other parts of the year (e.g., between May and December). In the event the large amount of change is consistent with the expected amount of data change, file system manager 115 may dismiss the data changes as a possible malicious software infection.

Using a single piece of information, such as a statistic associated with the data included in a backup snapshot to determine whether a file stored on the primary system or the actual primary system is potentially infected with malicious software may lead to a plurality of false positives (e.g., determine the file or the primary system is potentially infected with malicious software when the file or the primary system is not infected with malicious software). The number of false positives detected by file system manager 115 may be reduced by using a plurality of pieces of information (e.g. a plurality of statistics associated with the backup snapshot). For example, an amount of deduplication associated with a backup snapshot may be determined. In the event the amount of deduplication associated with the backup snapshot is greater than a deduplication threshold, the number of files included in a backup snapshot that were added, deleted, or modified may be determined. In the event the number of files included in a backup snapshot that were added, deleted, or modified is greater than a change threshold, an entropy of the changed data associated with the files included in the backup snapshot may be determined. In the event the entropy of the changed data associated with the files included in the backup snapshot is greater than an entropy threshold, one or more files included in the backup snapshot may be determined to be potentially infected with malicious software.

In some embodiments, a backup snapshot and its associated files have an associated retention policy. In some embodiments, a retention time policy condition is satisfied (e.g., a backup snapshot and associated view have been stored in storage for a particular amount of time) and it is determined that the backup snapshot and associated view are to be removed from storage. In the event the retention time policy condition has been satisfied, file system manager 115 may determine that the file system metadata snapshot tree and associated file metadata trees are to be removed from storage. However, in the event a version of a file included in the backup snapshot to be deleted is associated with a later version of the file that has been determined to be possibly infected with malicious software, a hold may be placed on the file and the backup snapshot is not removed from storage. In other embodiments, a storage cluster may receive from a third party (e.g., website) information associated with malicious software (e.g., a new virus has infected a plurality of computers). In response to receiving the information associated with malicious software, the storage cluster may be configured to place a data lock on one or more files. For example, a data lock may be placed on one or more files that are to be removed from storage. A data lock may be placed on one or more files that are determined not to be potentially infected with malicious software. A data lock may be placed on a last known uninfected version of a file. A data lock may be placed on a last known uninfected backup snapshot. Advantageously, by overriding the retention policy responsive to detecting the relationship between a backup snapshot and the possibly infected later version of a file and/or backup snapshot, the ability to recover from a malicious software infection is preserved.

Upon detecting that a file or data included in the backup snapshot may have been infected with malicious software, storage cluster 112 may be configured to provide a notification to a user associated with primary system 102. The notification may indicate that a file, and by extension primary system 102, have been infected with malicious software. The notification may also provide a link to a set of one or more clean backup snapshots (e.g., a backup snapshot that has not been infected with malicious software). The notification may also provide a link to a set of one or more clean backup file versions (e.g., a version of the file that has not been infected with malicious software). A backup snapshot may be determined to be a clean backup snapshot in the event the backup snapshot does not include the data chunks that indicate a file has been infected with malicious software. A version of a file may be determined to be a clean backup file in the event the backup snapshot associated with the clean file does not include the data chunks that indicate the file has been infected with malicious software. Upon receiving a selection from the user, storage cluster 112 may be configured to restore the file and/or primary system 102 to the state associated with the selected clean backup snapshot/file version.

In other embodiments, storage cluster 112 is configured to receive a selection of a backup snapshot to restore to a destination. File system manager 115 may analyze the selected backup snapshot to determine whether the backup snapshot has been potentially infected with malicious software. In the event it is determined that the selected backup snapshot has been potentially infected with malicious software, storage cluster 112 may provide a notification that the selected backup snapshot may be infected with malicious software. In some embodiments, a user may still elect to restore the selected backup snapshot in light of the notification. In other embodiments, storage cluster 112 may provide a set of alternative backup snapshots that are known to be clean backup snapshots and the user may decide to restore one of the clean backup snapshots. In the event it is determined that the selected backup snapshot has not been potentially infected with malicious software, storage cluster 112 may restore the selected backup snapshot to the destination.

Figure 1B:
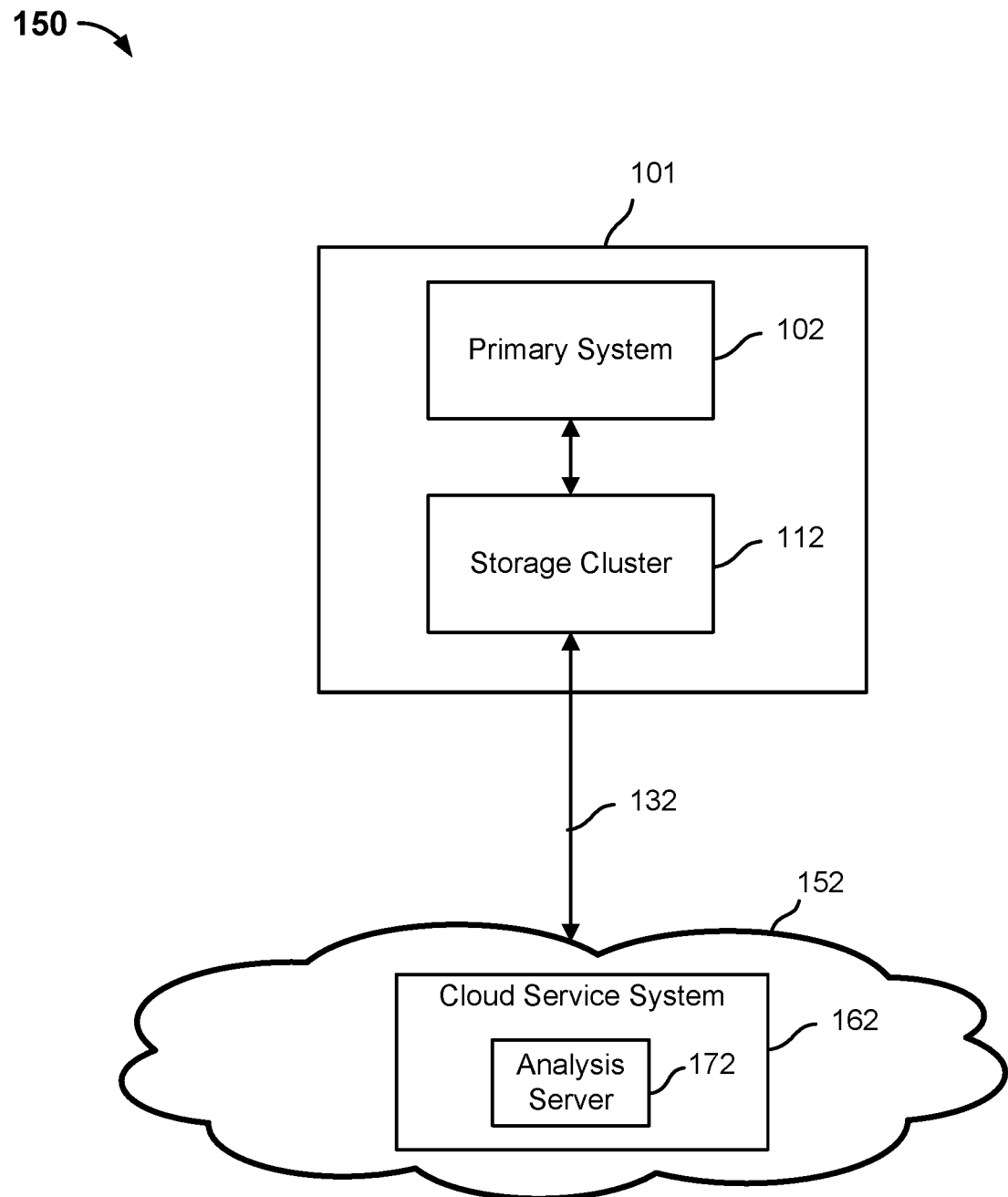
FIG. 1B is a block diagram illustrating an embodiment of a system for detecting malicious software.

FIG. 1B is a block diagram illustrating an embodiment of a system for detecting malicious software. In the example shown, system 150 includes a datacenter 101 and a cloud environment 152. Datacenter 101 includes a primary system 102 and a storage cluster 112. Storage cluster 112 is coupled to cloud environment 152 via network connection 132. Cloud environment 152 includes an analysis server 172 hosted in a cloud service system 162. In some embodiments, the analysis performed by analysis server 172 is performed by storage cluster 112.

Primary system 102 may be configured to send a backup snapshot of file system data to storage cluster 112. The backup snapshot may correspond to a full backup snapshot or an incremental backup snapshot. Storage cluster 112 may be configured to ingest the file system data and to store the file system data across a plurality of storage nodes (not shown). Storage cluster 112 may be configured to determine one or more statistics associated with the data included in the backup snapshot while the backup snapshot is being ingested. In some embodiments, one or more files included in the backup snapshot, and by extension, the backup snapshot itself, may be determined to be potentially infected with malicious software based on one or more statistics associated with the data included in the backup snapshot. Storage cluster 112 may include a file system manager (not shown) that is configured to organize the file system data using a tree data structure.

In some embodiments, the one or more statistics associated with the data included in the backup snapshot include the total amount of data that was included in the backup snapshot. Malicious software may encrypt file system data of primary system 102. When primary system 102 performs an incremental backup snapshot, the encrypted file system data may be included in the incremental backup snapshot because the encrypted file system data was not previously backed up.

In other embodiments, the one or more statistics associated with the data included in the backup snapshot include the total amount of data associated with a particular file included in the backup snapshot. Malicious software may encrypt portions of or an entire file. When primary system 102 performs an incremental backup snapshot, the encrypted portions of the file may be included in the incremental backup snapshot because they were not previously backed up.

In other embodiments, the one or more statistics associated with the data included in the backup snapshot include determining the total amount of deduplication associated with the data included in the backup snapshot. A backup snapshot where a small amount of the data is deduplicated may indicate that the backup snapshot has been potentially infected with malicious software because data that is unable to be deduplicated may indicate that the data is encrypted. When primary system 102 performs an incremental backup snapshot, the encrypted portions of the file may be included in the incremental backup snapshot because they were not previously backed up. Data that is unable to be deduped because it is encrypted may indicate that the primary system has been potentially infected with malicious software.

In other embodiments, the one or more statistics associated with the data included in the backup snapshot include determining the amount of deduplication associated with a file included in the backup snapshot. A file may undergo a large amount of change since a previous backup snapshot. The portions of the file that have changed may be analyzed to determine whether deduplication has occurred with respect to the changed portion. Data that is unable to be deduped because it is encrypted may indicate that the file, and by extension the primary system, have been potentially infected with malicious software because data that has been infected with malicious software is usually encrypted and unable to be deduped.

In other embodiments, the one or more statistics associated with the data included in the backup snapshot include a number of files included in the backup snapshot that were added, deleted, and/or modified. The number of files included in the backup snapshot that were added, deleted, and/or modified may be compared to a change threshold. In the event the number of files included in the backup snapshot that were added, deleted, and/or modified is greater than the change threshold, the changed files associated with the backup snapshot may be determined to have been potentially infected with malicious software.

In other embodiments, the one or more statistics associated with the data included in the backup snapshot include an entropy of the changed data. The entropy of the changed data may be a measure of randomness associated with a file. An amount of compression associated with a file may be used to indirectly measure the entropy of the changed data associated with the file. In some embodiments, for systems that maintain fine-grained pre/post compression and pre/post deduplication statistics, entropy may be inferred from fine-grained pre/post compression and pre/post deduplication statistics. In some embodiments, for systems that do not maintain fine-grained pre/post compression and pre/post deduplication statistics, entropy may be inferred from compression statistics associated with a sample of the data chunks associated with the changed data. Compression statistics associated with a sample of the data chunks of the changed data may be determined. Unique data chunks (e.g., non-deduped data chunks) may be sampled. The unique data chunks of the changed data may be randomly sampled or sampled using one or more different sampling techniques. In the event the sampled changed data compresses more than a compression threshold, the changed data associated with the file may be determined to be less random, which indicates the entropy of the changed data is small (e.g., less than an entropy threshold). In the event the sampled changed data compresses less than the compression threshold, i.e., the entropy of the changed data associated with a file is greater than an entropy threshold, the file may be determined to have been potentially infected with malicious software.

Storage cluster 112 may be configured to provide the one or more statistics associated with the backup snapshot to analysis server 172 of cloud server system 162 hosted in cloud environment 152. Cloud environment 152 may correspond to a public cloud environment (e.g., Amazon Web Services, Microsoft Azure, Google Cloud, etc.).

Analysis server 172 may be configured to determine whether a primary system has been potentially infected with malicious software based on the one or more statistics associated with the backup snapshot.

In some embodiments, analysis server 172 is configured to determine whether a backup snapshot has been potentially infected with malicious software based on the rate of change per backup snapshot. The total amount of data change for the backup snapshot may be compared to the rate of change associated with one or more previous backup snapshots associated with primary system 102. The rate of data change per backup snapshot may indicate whether the backup snapshot has been infected with malicious software because a primary system that has been infected with malicious software is likely to have a large amount of data change per incremental backup snapshot. Analysis server 172 may compare the rate at which the data associated with an incremental backup snapshot has changed to a historical rate (e.g., average, moving average) at which the data associated with an incremental backup snapshot associated with primary system 102 has changed. The average rate of change per backup snapshot may be determined. Analysis server 172 may compare the rate of data change for a particular backup snapshot to the average rate of change per backup snapshot associated with primary system 102. In the event the rate of change for a particular backup snapshot is greater than the historical rate of change per backup snapshot associated with primary system 102 by a threshold (e.g., certain amount, certain percentage, more than one standard deviation, any other statistical measure), analysis server 172 may indicate (e.g., flag) the backup snapshot associated with primary system 102 as being potentially infected by malicious software.

The total amount of data change for the backup snapshot associated with primary system 102 may be compared to a seasonality rate at which the data associated with a backup snapshot associated with primary system 102 has changed. For example, the total amount of data change for a backup snapshot associated with primary system 102 may fluctuate based on a particular time of year. Analysis server 172 may compare the total amount of data change for the backup snapshot to an expected amount of change for the particular time of year. In the event the total amount of data change for the backup snapshot is greater than the expected amount of change for the particular time of year by a threshold (e.g., certain amount, certain percentage, more than one standard deviation, any other statistical measure), analysis server 172 may indicate the backup snapshot as being potentially infected by malicious software.

The total amount of data change for the backup snapshot associated with primary system 102 may be compared to a trending rate at which the data associated with a backup snapshot associated with primary system 102 has changed. For example, the total amount of data change for the backup snapshot may have increased over a particular time period (e.g., the last two weeks). Analysis server 172 may compare the total amount of data change for the backup snapshot to the trending rate for the particular time period. In the event the total amount of data change for the backup snapshot is greater than the trending rate for the particular time period by a threshold (e.g., certain amount, certain percentage, more than one standard deviation, any other statistical measure), analysis server 172 may indicate the file as being potentially infected by malicious software.

In some embodiments, a rate at which a file has changed over a plurality of backup snapshots associated with primary system 102 may be compared to determine whether a file has been infected with malicious software. File system manager 115 may be configured to analyze the file metadata tree associated with a file and determine the amount of data associated with the file that has changed per backup snapshot by traversing the file metadata trees associated with the file. For example, file system manager 115 may traverse the file metadata trees associated with a particular file and determine that on average the particular file exhibits a less than 5% change per backup snapshot over the ten backup snapshots before the last backup snapshot. However, for the last backup snapshot, file system manager 115 may traverse the file metadata tree associated with the last backup snapshot and determine that the particular file has exhibited a 50% change.

The rate at which the data associated with a file has changed for a backup snapshot associated with primary system 102 may be compared to a historical rate (e.g., average, moving average) at which the data associated with the file has changed. For example, the amount of change associated with a file may fluctuate at any time of the year. The average rate of change per backup snapshot for the file may be determined. Analysis server 172 may compare the rate at which the file has changed for a particular backup snapshot to the average rate of change per backup snapshot. In the event the rate at which the data associated with the file has changed for a particular backup snapshot is greater than the historical rate of change per backup snapshot by a threshold (e.g., certain amount, certain percentage, more than one standard deviation, any other statistical measure), analysis server 172 may indicate (e.g., flag) the file as being potentially infected by malicious software.

The rate at which the data associated with a particular file has changed for a particular backup snapshot associated with primary system 102 may be compared to a seasonality rate at which the data associated with the particular file has changed. For example, the amount of change associated with a file may fluctuate based on a particular time of year. Analysis server 172 may compare the rate at which the file has changed for a particular backup snapshot to an expected rate of change for the particular time of year. In the event the rate at which the data associated with the file has changed for a particular backup snapshot is greater than the expected rate of change for the particular time of year by a threshold (e.g., certain amount, certain percentage, more than one standard deviation, any other statistical measure), analysis server 172 may indicate the file as being potentially infected by malicious software.

The rate at which the data associated with a particular file has changed for a particular backup snapshot associated with primary system 102 may be compared to a trending rate at which the data associated with the particular file has changed. For example, the amount of change associated with a file may have increased over a particular time period (e.g., the last two weeks). Analysis server 172 may compare the rate at which the file has changed for a particular backup snapshot to the trending rate for the particular time period. In the event the rate at which the data associated with the file has changed for a particular backup snapshot is greater than the trending rate for the particular time period by a threshold (e.g., certain amount, certain percentage, more than one standard deviation, any other statistical measure), analysis server 172 may indicate the file as being potentially infected by malicious software.

In other embodiments, analysis server 172 is configured to determine whether a backup snapshot associated with primary system 102 has been potentially infected with malicious software based on an amount of deduplication associated with the backup snapshot. A large amount of deduplication (e.g., greater than a first deduplication threshold) may indicate that the primary system has not been infected with malicious software because deduplication is possible. File system data that is encrypted because of malicious software may be less likely to be deduped. A small amount of deduplication data (e.g., less than a second deduplication threshold) may indicate that the primary system has been potentially infected with malicious software because a large portion of the file system data is unable to be deduped.

In other embodiments, analysis server 172 is configured to determine whether a backup snapshot associated with primary system 102 has been potentially infected with malicious software based on an amount of deduplication associated with a file included in the backup snapshot. In other embodiments, analysis server 172 is configured to determine whether a backup snapshot associated with primary system 102 has been potentially infected with malicious software based on the rate at which particular portions of a file have changed over a plurality of backup snapshots. Analysis server 172 may determine that a particular file that normally does not see a large amount of change per backup snapshot, but experienced a large amount of change (e.g., greater than a threshold) with respect to the last backup snapshot may have been potentially infected with malicious software. Analysis server 172 may determine that particular file offsets associated with a particular file that normally do not see a large amount of change per backup snapshot, but experienced a large amount of change (e.g., greater than a threshold) with respect to the last backup snapshot may have been potentially infected with malicious software.

In some embodiments, analysis server 172 is configured to determine whether data included in the backup snapshot has been potentially infected with malicious software based on the number of files included in the backup snapshot that were added, deleted, and/or modified. In some embodiments, analysis server 172 is configured to determine whether data included in the backup snapshot has been potentially infected with malicious software based on an entropy of the changed data.

Using a single statistic associated with the data included in a backup snapshot to determine whether a file stored on the primary system or the actual primary system is potentially infected with malicious software may lead to a plurality of false positives (e.g., determine the file or the primary system is potentially infected with malicious software when the file or the primary system is not infected with malicious software). The number of false positives detected by analysis server 172 may be reduced by using a plurality of the statistics associated with the backup snapshot. For example, an amount of deduplication associated with a backup snapshot may be determined. In the event the amount of deduplication associated with the backup snapshot is greater than a deduplication threshold, the number of files included in a backup snapshot that were added, deleted, or modified may be determined. In the event the number of files included in a backup snapshot that were added, deleted, or modified is greater than a change threshold, an entropy of the changed data associated with the files included in the backup snapshot may be determined. In the event the entropy of the changed data associated with the files included in the backup snapshot is greater than an entropy threshold, one or more files included in the backup snapshot may be determined to be potentially infected with malicious software.

Analysis server 172 may provide a notification to storage cluster 112. In other embodiments, analysis server 172 provides a notification to primary system 102. The notification may indicate that the data included in the backup snapshot has been potentially infected with malicious software. The notification may indicate that a file and/or primary system 102 have been infected with malicious software. The notification may also provide a link to a set of one or more clean backup snapshots (e.g., a backup snapshot that has not been infected with malicious software). The notification may also provide a link to a set of one or more clean backup file versions (e.g., a version of the file that has not been infected with malicious software). A backup snapshot may be determined to be a clean backup snapshot in the event the backup snapshot does not include the data chunks that indicate a file has been infected with malicious software. A version of a file may be determined to be a clean backup file in the event the backup snapshot associated with the clean file does not include the data chunks that indicate the file has been infected with malicious software. Upon receiving a selection from the user, storage cluster 112 may be configured to restore the file and/or primary system 102 to the state associated with the selected clean backup snapshot/file version.

In other embodiments, storage cluster 112 is configured to receive a selection of a backup snapshot to restore to a destination. The file system manager of storage cluster 112 may analyze the selected backup snapshot to determine whether the backup snapshot has been potentially infected with malicious software. In the event it is determined that the selected backup snapshot has been potentially infected with malicious software, storage cluster 112 may provide a notification that the selected backup snapshot may be infected with malicious software. In some embodiments, a user may still elect to restore the selected backup snapshot in light of the notification. In other embodiments, storage cluster 112 may provide a set of alternative backup snapshots that are known to be clean backup snapshots and the user may decide to restore one of the clean backup snapshots. In the event it is determined that the selected backup snapshot has not been potentially infected with malicious software, storage cluster 112 may restore the selected backup snapshot to the destination.

Figure 2A:
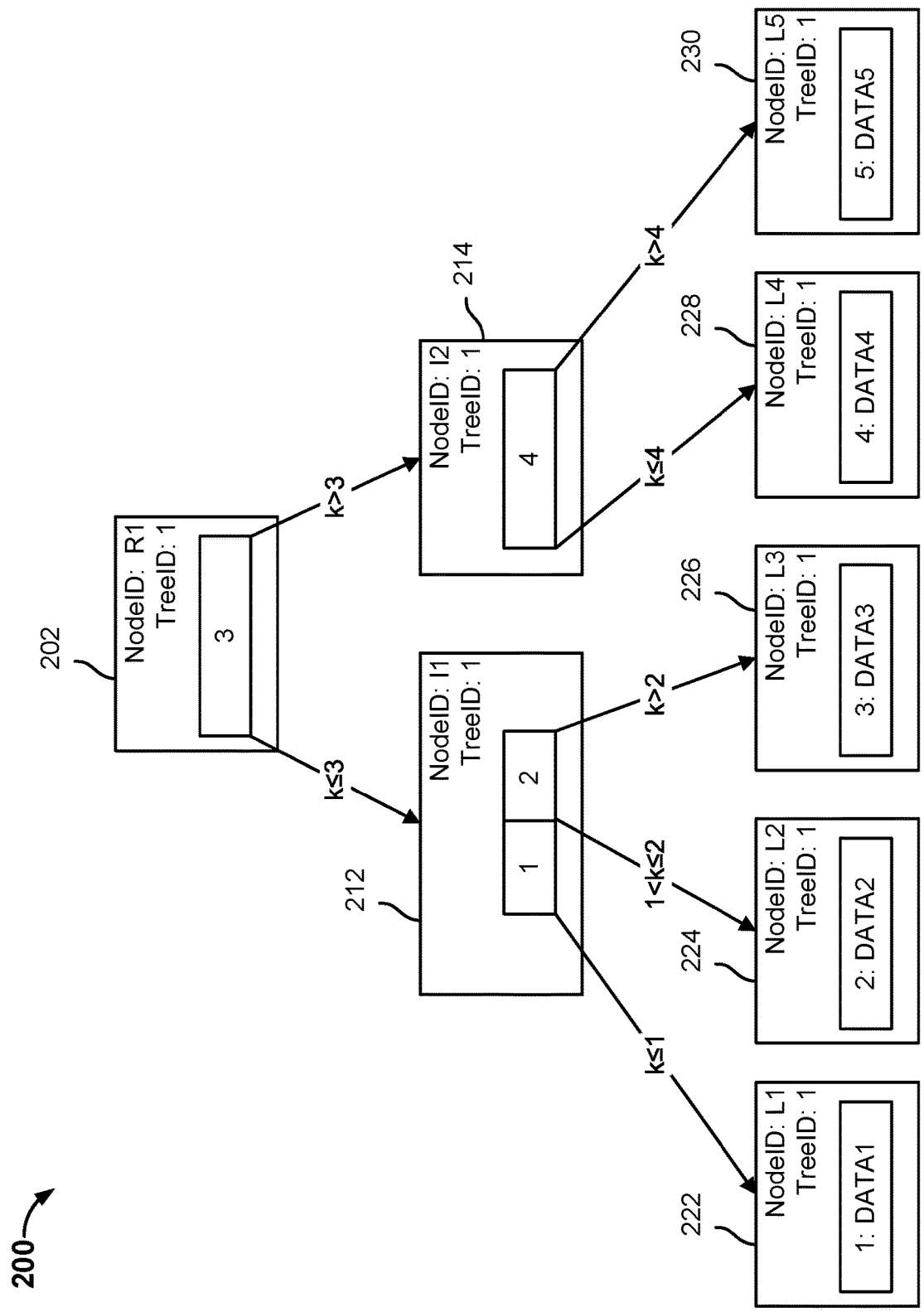
FIG. 2A is a block diagram illustrating an embodiment of a tree data structure.

FIG. 2A is a block diagram illustrating an embodiment of a tree data structure. A tree data structure may be used to represent the file system data that is stored on a storage cluster, such as storage cluster 112. The file system data may include metadata for a distributed file system and may include information, such as chunk identifier, chunk offset, file size, directory structure, file permissions, physical storage locations of the files, etc. A file system manager, such as file system manager 115, may generate tree data structure 200.

In the example shown, tree data structure 200 is comprised of a snapshot tree that includes a root node 202, intermediate nodes 212, 214, and leaf nodes 222, 224, 226, 228, and 230. Although tree data structure 200 includes one intermediate level between root node 202 and leaf nodes 222, 224, 226, 228, 230, any number of intermediate levels may be implemented. Tree data structure 200 may correspond to a backup snapshot of file system data at a particular point in time t, for example at time to. The backup snapshot may be received from a primary system, such as primary system 102. The snapshot tree in conjunction with a plurality of file metadata trees may provide a complete view of the primary system associated with the backup snapshot for the particular point in time.

A root node is the starting point of a snapshot tree and may include pointers to one or more other nodes. An intermediate node is a node to which another node points (e.g., root node, other intermediate node) and includes one or more pointers to one or more other nodes. A leaf node is a node at the bottom of a snapshot tree. Each node of the tree structure includes a view identifier of a view with which the node is associated (e.g., TreeID).

A leaf node may be configured to store key-value pairs of file system data. A data key k is a lookup value by which a particular leaf node may be accessed. For example, "1" is a data key that may be used to lookup "DATA1" of leaf node 222. The data key k may correspond to a brick number of a data brick. A data brick may be comprised of one or more data blocks. In some embodiments, the leaf node is configured to store file system metadata (e.g., chunk identifier (e.g., hash value, SHA-1, etc.), file size, directory structure, file permissions, physical storage locations of the files, etc.).

A leaf node may store a data key k and a pointer to a location that stores the value associated with the data key.

In other embodiments, a leaf node is configured to store the actual data when the file is less than or equal to a limit size. For example, data associated with a file that is less than or equal to 256 kB may reside in the leaf node of a snapshot tree. In some embodiments, a leaf node includes a pointer to a file metadata tree (e.g., blob structure) when the size of the file is larger than the limit size. For example, a leaf node may include a pointer to a file metadata tree corresponding to a virtual machine container file.

A root node or an intermediate node may include one or more node keys. The node key may be an integer value or a non-integer value. Each node key indicates a division between the branches of the node and indicates how to traverse the tree structure to find a leaf node, i.e., which pointer to follow. For example, root node 202 may include a node key of "3." A data key k of a key-value pair that is less than or equal to the node key is associated with a first branch of the node and a data key k of a key-value pair that is greater than the node key is associated with a second branch of the node. In the above example, to find a leaf node storing a value associated with a data key of "1," "2," or "3," the first branch of root node 202 would be traversed to intermediate node 212 because the data keys of "1," "2", and "3" are less than or equal to the node key "3." To find a leaf node storing a value associated with a data key of "4" or "5," the second branch of root node 202 would be traversed to intermediate node 214 because data keys "4" and "5" are greater than the node key of "3."

In some embodiments, a hash function may determine which branch of a node with which the non-numerical key is associated. For example, a hash function may determine that a first bucket is associated with a first branch of a node and a second bucket is associated with a second branch of the node.

A data key k of a key-value pair is not limited to a numerical value. In some embodiments, non-numerical data keys may be used for a data key-value pair (e.g., "name," "age", etc.) and a numerical number may be associated with the non-numerical data key. For example, a data key of "name" may correspond to a numerical key of "3." Data keys that alphabetically come before the word "name" or is the word "name" may be found following a left branch associated with a node. Data keys that alphabetically come after the word "name" may be found by following a right branch associated with the node. In some embodiments, a hash function may be associated with the non-numerical data key. The hash function may determine which branch of a node with which the non-numerical data key is associated.

In the example shown, root node 202 includes a pointer to intermediate node 212 and a pointer to intermediate node 214. Root node 202 includes a NodeID of "R1" and a TreeID of "1." The NodeID may identify the name of the node. The TreeID may identify the view with which the node is associated. When a change is made to data stored in a leaf node as described with respect to FIGS. 2B, 2C, and 2D, the TreeID may be used to determine whether a copy of a node is to be made.

Root node 202 includes a node key that divides a set of pointers into two different subsets. Leaf nodes (e.g., "1-3") with a data key k that is less than or equal to the node key are associated with a first branch and leaf nodes (e.g., "4-5") with a data key k that is greater than the node key are associated with a second branch. Leaf nodes with a data key of "1," "2," or "3" may be found by traversing tree data structure 200 from root node 202 to intermediate node 212 because the data keys have a value that is less than or equal to the node key. Leaf nodes with a data key of "4" or "5" may be found by traversing tree data structure 200 from root node 202 to intermediate node 214 because the data keys have a value that is greater than the node key.

Root node 202 includes a first set of pointers. The first set of pointers associated with a data key less than or equal to the node key (e.g., "1", "2," or "3") indicates that traversing tree data structure 200 from root node 202 to intermediate node 212 will lead to a leaf node with a data key of "1," "2," or "3." Intermediate node 214 includes a second set of pointers. The second set of pointers associated with a data key greater than the node key indicates that traversing tree data structure 200 from root node 202 to intermediate node 214 will lead to a leaf node with a data key of "4" or "5."

Intermediate node 212 includes a pointer to leaf node 222, a pointer to leaf node 224, and a pointer to leaf node 226. Intermediate node 212 includes a NodeID of "I1" and a TreeID of "1." Intermediate node 212 includes a first node key of "1" and a second node key of "2." The data key k for leaf node 222 is a value that is less than or equal to the first node key. The data key k for leaf node 224 is a value that is greater than the first node key and less than or equal to the second node key. The data key k for leaf node 226 is a value that is greater than the second node key. The pointer to leaf node 222 indicates that traversing tree data structure 200 from intermediate node 212 to leaf node 222 will lead to the node with a data key of "1." The pointer to leaf node 224 indicates that traversing tree data structure 200 from intermediate node 212 to leaf node 224 will lead to the node with a data key of "2." The pointer to leaf node 226 indicates that traversing tree data structure 200 from intermediate node 212 to leaf node 226 will lead to the node with a data key of "3."

Intermediate node 214 includes a pointer to leaf node 228 and a pointer to leaf node 230. Intermediate node 212 includes a NodeID of "I2" and a TreeID of "1." Intermediate node 214 includes a node key of "4." The data key k for leaf node 228 is a value that is less than or equal to the node key. The data key k for leaf node 230 is a value that is greater than the node key. The pointer to leaf node 228 indicates that traversing tree data structure 200 from intermediate node 214 to leaf node 228 will lead to the node with a data key of "4." The pointer to leaf node 230 indicates that traversing tree data structure 200 from intermediate node 214 to leaf node 230 will lead to the node with a data key of "5."

Leaf node 222 includes a data key-value pair of "1: DATA1." Leaf node 222 includes NodeID of "L1" and a TreeID of "1." To view the value associated with a data key of "1," tree data structure 200 is traversed from root node 202 to intermediate node 212 to leaf node 222. In some embodiments, leaf node 222 is configured to store metadata associated with a file. In some embodiments, leaf node 222 is configured to store data associated with a file. In other embodiments, leaf node 222 is configured to store a pointer to a file metadata tree.

Leaf node 224 includes a data key-value pair of "2: DATA2." Leaf node 224 includes NodeID of "L2" and a TreeID of "1." To view the value associated with a data key of "2," tree data structure 200 is traversed from root node 202 to intermediate node 212 to leaf node 224. In some embodiments, leaf node 224 is configured to store metadata associated with a file. In some embodiments, leaf node 224 is configured to store data associated with a file. In other embodiments, leaf node 224 is configured to store a pointer to a file metadata tree.

Leaf node 226 includes a data key-value pair of "3: DATA3." Leaf node 226 includes NodeID of "L3" and a TreeID of "1." To view the value associated with a data key of "3," tree data structure 200 is traversed from root node 202 to intermediate node 212 to leaf node 226. In some embodiments, leaf node 226 is configured to store metadata associated with a file. In some embodiments, leaf node 226 is configured to store data associated with a file. In other embodiments, leaf node 226 is configured to store a pointer to a file metadata tree.

Leaf node 228 includes a data key-value pair of "4: DATA4." Leaf node 228 includes NodeID of "L4" and a TreeID of "1." To view the value associated with a data key of "4," tree data structure 200 is traversed from root node 202 to intermediate node 214 to leaf node 228. In some embodiments, leaf node 228 is configured to store metadata associated with a file. In some embodiments, leaf node 228 is configured to store data associated with a file. In other embodiments, leaf node 228 is configured to store a pointer to a file metadata tree.

Leaf node 230 includes a data key-value pair of "5: DATA5." Leaf node 230 includes NodeID of "L5" and a TreeID of "1." To view the value associated with a data key of "5," tree data structure 200 is traversed from root node 202 to intermediate node 214 to leaf node 230. In some embodiments, leaf node 230 is configured to store metadata associated with a file. In some embodiments, leaf node 230 is configured to store data associated with a file. In other embodiments, leaf node 230 is configured to store a pointer to a file metadata tree.

Figure 2B:
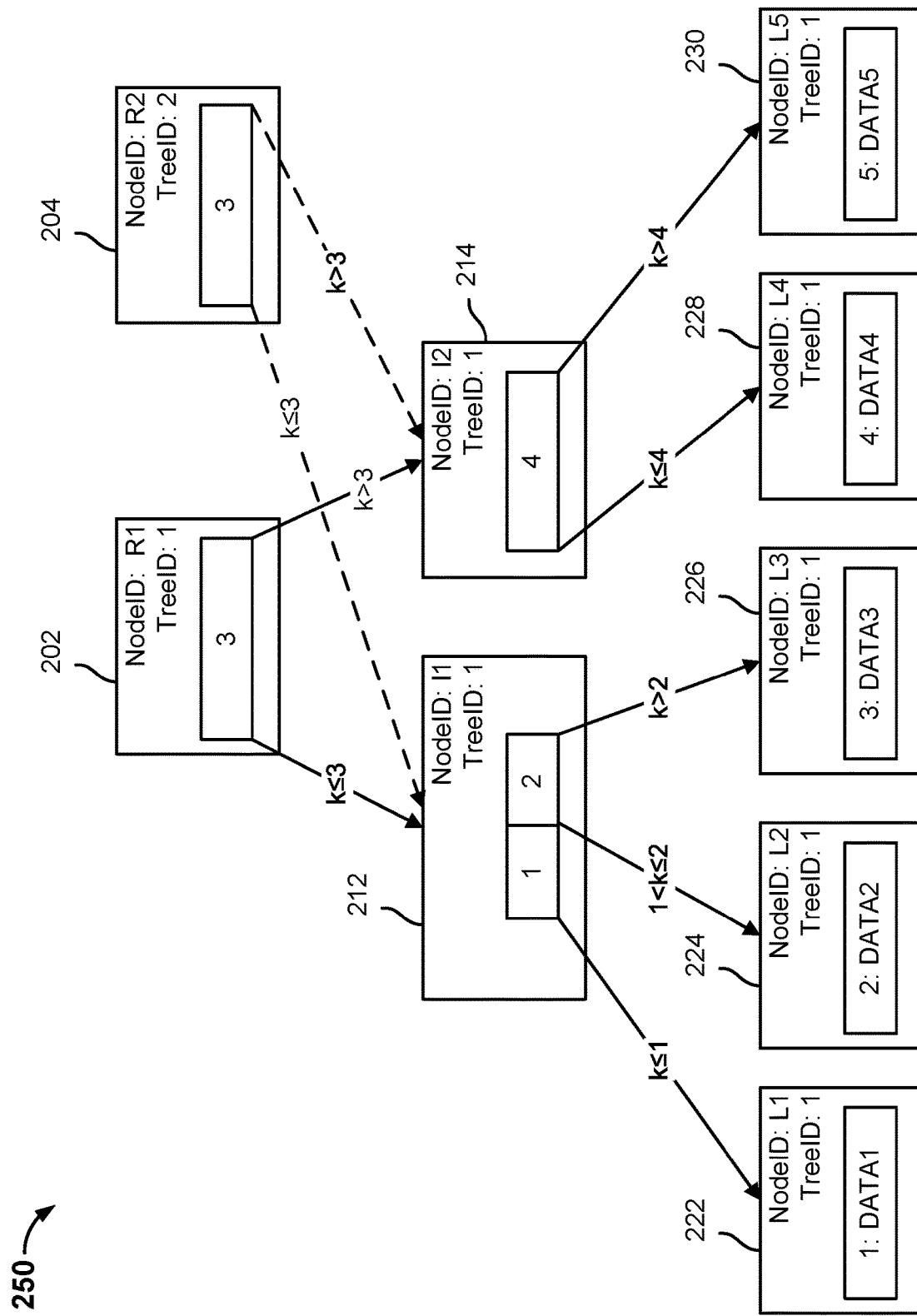
FIG. 2B is a block diagram illustrating an embodiment of a cloned snapshot tree.

FIG. 2B is a block diagram illustrating an embodiment of a cloned snapshot tree. A snapshot tree may be cloned when a snapshot tree is added to a tree data structure. In some embodiments, tree data structure 250 may be created by a storage system, such as storage cluster 112. The file system data of a primary system, such as primary system 102, may be backed up to a storage cluster, such as storage cluster 112. A subsequent backup snapshot may correspond to a full backup snapshot or an incremental backup snapshot. The manner in which the file system data corresponding to the subsequent backup snapshot is stored in storage cluster 112 may be represented by a tree data structure. The tree data structure corresponding to the subsequent backup snapshot is created by cloning a snapshot tree associated with a last backup.

In the example shown, tree data structure 250 includes root nodes 202, 204, intermediate nodes 212, 214, and leaf nodes 222, 224, 226, 228, and 230. Tree data structure 250 may be a snapshot of file system data at a particular point in time t+n. The tree data structure can be used to capture different versions of file system data at different moments in time. The tree data structure may also efficiently locate desired metadata by traversing a particular version of a snapshot tree included in the tree data structure. In some embodiments, the tree data structure allows a chain of backup snapshot versions (i.e., snapshot trees) to be linked together by allowing a node of a later version of a snapshot tree to reference a node of a previous version of a snapshot tree. For example, a snapshot tree with root node 204 is linked to a snapshot tree with root node 202. Each time a snapshot is performed, a new root node may be created and the new root node includes the same set of pointers included in the previous root node, that is, the new root node of the snapshot may be linked to one or more intermediate nodes associated with a previous snapshot. The new root node also includes a different NodeID and a different TreeID. The TreeID is the view identifier associated with a view of the primary system associated with the backup snapshot for the particular moment in time.

In some embodiments, a root node is associated with a current view of the file system data. A current view may still accept one or more changes to the data. The TreeID of a root node indicates a snapshot with which the root node is associated. For example, root node 202 with a TreeID of "1" is associated with a first backup snapshot and root node 204 with a TreeID of "2" is associated with a second backup snapshot. In the example shown, root node 204 is associated with a current view of the file system data.

In other embodiments, a root node is associated with a snapshot view of the file system data. A snapshot view may represent a state of the file system data at a particular moment in time in the past and is not updated. In the example shown, root node 202 is associated with a snapshot view of the file system data.

In the example shown, root node 204 is a copy of root node 202. Similar to root node 202, root node 204 includes the same pointers as root node 202. Root node 204 includes a first set of pointers to intermediate node 212. The first set of pointers associated with a data key k less than or equal to the node key (e.g., "1," "2," or "3") indicates that traversing tree data structure 250 from root node 204 to intermediate node 212 will lead to a leaf node with a data key of "1," "2," or "3." Root node 204 includes a second set of pointers to intermediate node 214. The second set of pointers associated with a data key k greater than the node key indicates that traversing tree data structure 250 from root node 204 to intermediate node 214 will lead to a leaf node with a data key of "4" or "5." Root node 204 includes a NodeID of "R2" and a TreeID of "2." The NodeID identifies the name of the node. The TreeID identifies the backup snapshot with which the node is associated.

Figure 2C:
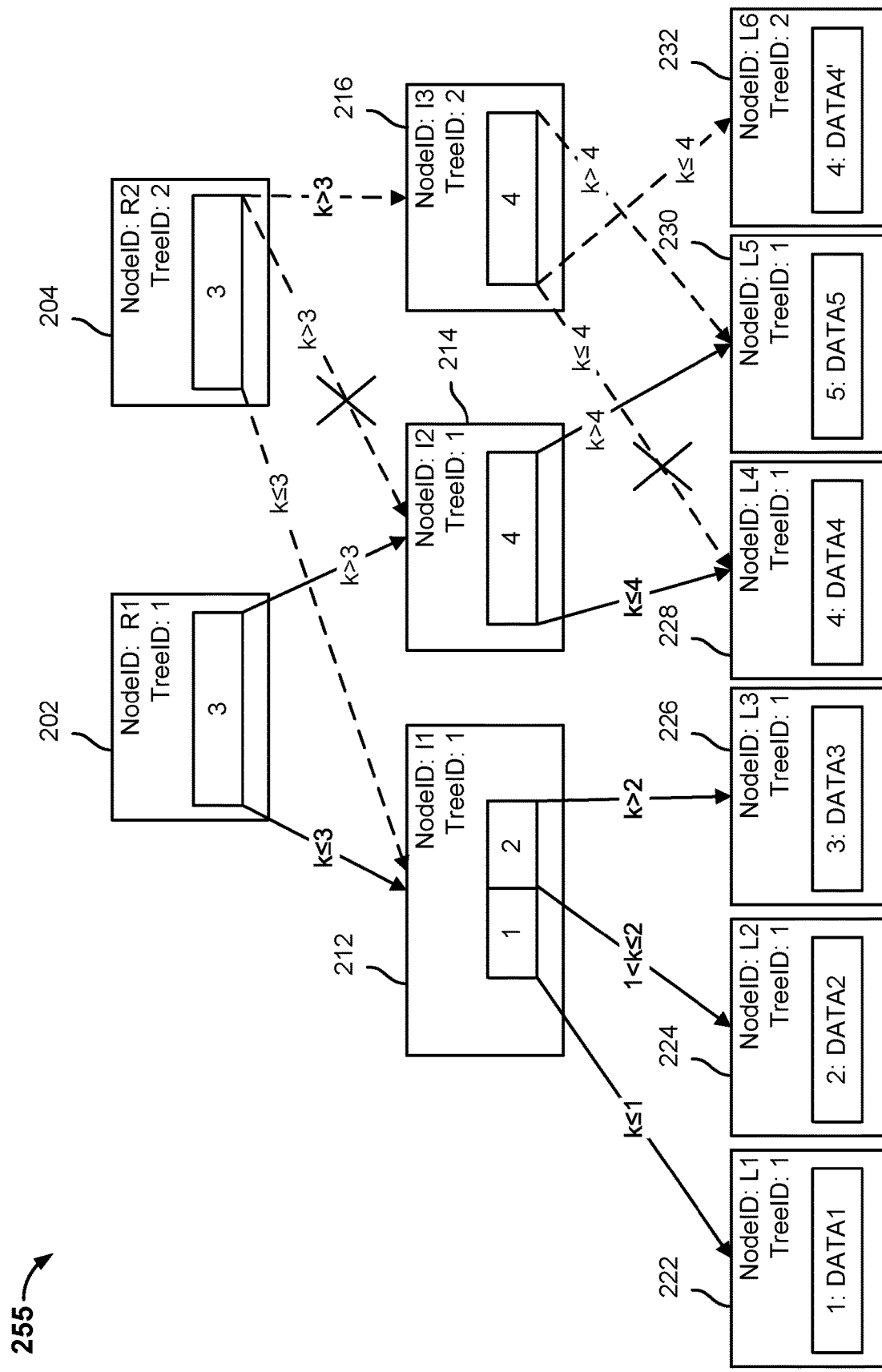
FIG. 2C is a block diagram illustrating an embodiment of modifying a snapshot tree.

FIG. 2C is a block diagram illustrating an embodiment of modifying a snapshot tree. In the example shown, tree data structure 255 may be modified by a file system manager, such as file system manager 115. A snapshot tree with a root node 204 may be a current view of the file system data at time t+n+m, for example, at time $t_2$. A current view may represent a state of the file system data that is up-to-date and capable of receiving one or more modifications to the snapshot tree that correspond to modifications to the file system data. Because a snapshot represents a perspective of the file system data that is "frozen" in time, one or more copies of one or more nodes affected by a change to file system data may be made.

In the event file system data includes data that has been infected with malicious software, the infected data does not affect the previously stored data because the infected data is associated with a cloned snapshot tree. The data stored by the storage system is immutable. Previously stored data is not modified. Instead the snapshot tree is updated to reference new data.

In the example shown, the value "DATA4" has been modified to be "DATA4'." In some embodiments, the value of a key value pair has been modified. For example, the value of "DATA4" may be a pointer to a file metadata tree corresponding to a first version of a virtual machine and the value of "DATA4'" may be a pointer to a file metadata tree corresponding to the second version of the virtual machine. In other embodiments, the value of the key value pair is the data of metadata associated with a content file that is smaller than or equal to a limit size. In other embodiments, the value of the key value pair points to a different file metadata tree.

The different file metadata tree may be a modified version of the file metadata tree that the leaf node previously pointed to.

At $t_2$, the file system manager starts at root node 204 because that is the root node associated with snapshot tree at time $t_2$ (i.e., the root node associated with the last backup snapshot). The value "DATA4" is associated with the data key "4." The file system manager traverses snapshot tree 255 from root node 204 until it reaches a target node, in this example, leaf node 228. The file system manager compares the TreeID at each intermediate node and leaf node with the TreeID of the root node. In the event the TreeID of a node matches the TreeID of the root node, the file system manager proceeds to the next node. In the event the TreeID of a node does not match the TreeID of the root node, a shadow copy of the node with the non-matching TreeID is made. For example, to reach a leaf node with a data key of "4," the file system manager begins at root node 204 and proceeds to intermediate node 214. The file system manager compares the TreeID of intermediate node 214 with the TreeID of root node 204, determines that the TreeID of intermediate node 214 does not match the TreeID of root node 204, and creates a copy of intermediate node 214. The intermediate node copy 216 includes the same set of pointers as intermediate node 214, but includes a TreeID of "2" to match the TreeID of root node 204. The file system manager updates a pointer of root node 204 to point to intermediate node 216 instead of pointing to intermediate node 214. The file system manager traverses tree data structure 255 from intermediate node 216 to leaf node 228, determines that the TreeID of leaf node 228 does not match the TreeID of root node 204, and creates a copy of leaf node 228. Leaf node copy 232 stores the modified value "DATA4'" and includes the same TreeID as root node 204. The file system manager updates a pointer of intermediate node 216 to point to leaf node 232 instead of pointing to leaf node 228.

In some embodiments, leaf node 232 stores the value of a key value pair that has been modified. In other embodiments, leaf node 232 stores the modified data of metadata associated with a file that is smaller than or equal to a limit size. In other embodiments, leaf node 232 stores a pointer to a file metadata tree corresponding to a file, such as a virtual machine container file.

Figure 2D:
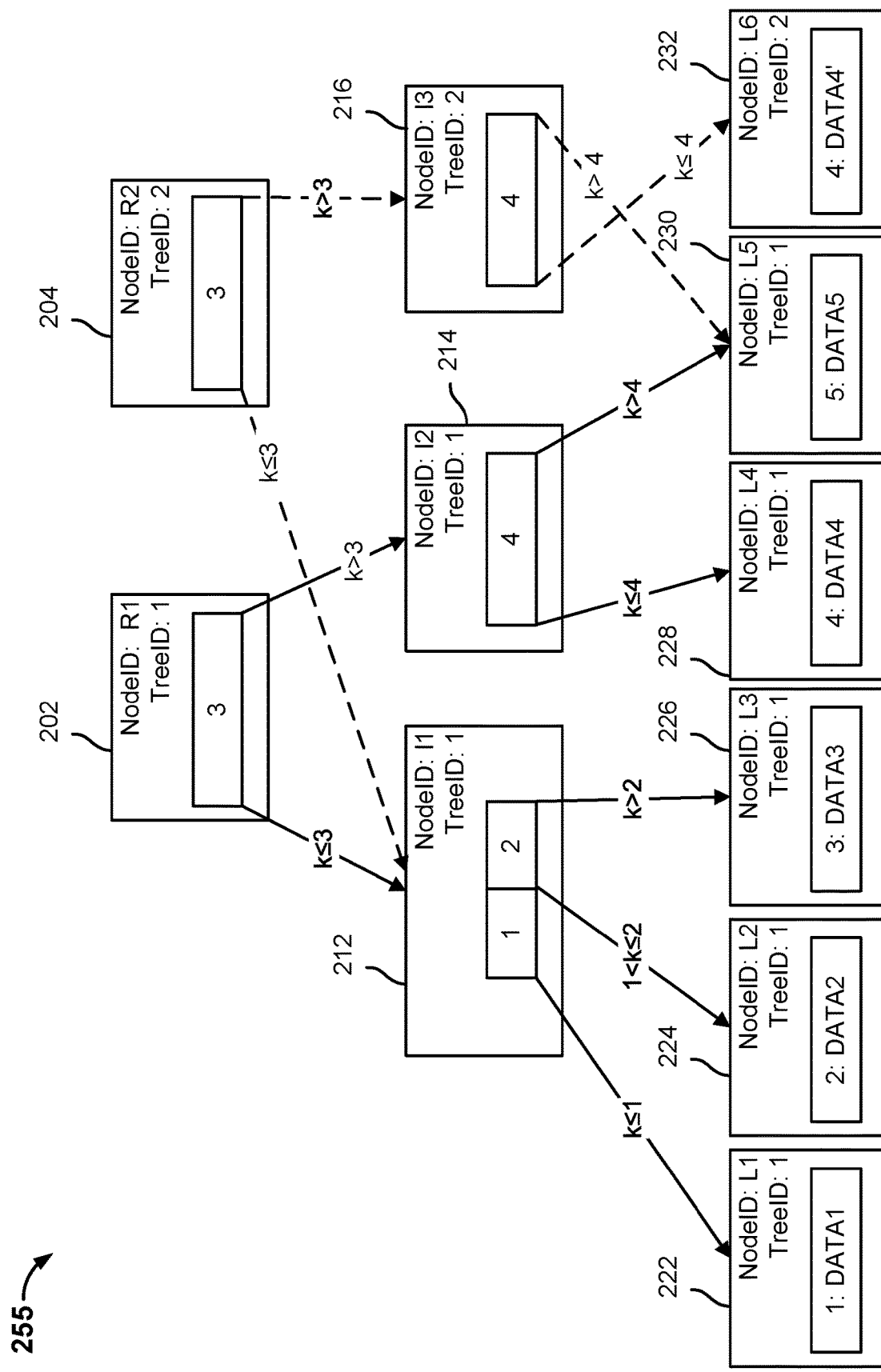
FIG. 2D is a block diagram illustrating an embodiment of a modified snapshot tree.

FIG. 2D is a block diagram illustrating an embodiment of a modified snapshot tree. Tree data structure 255 shown in FIG. 2D illustrates a result of the modifications made to a snapshot tree as described with respect to FIG. 2C.

Figure 3A:
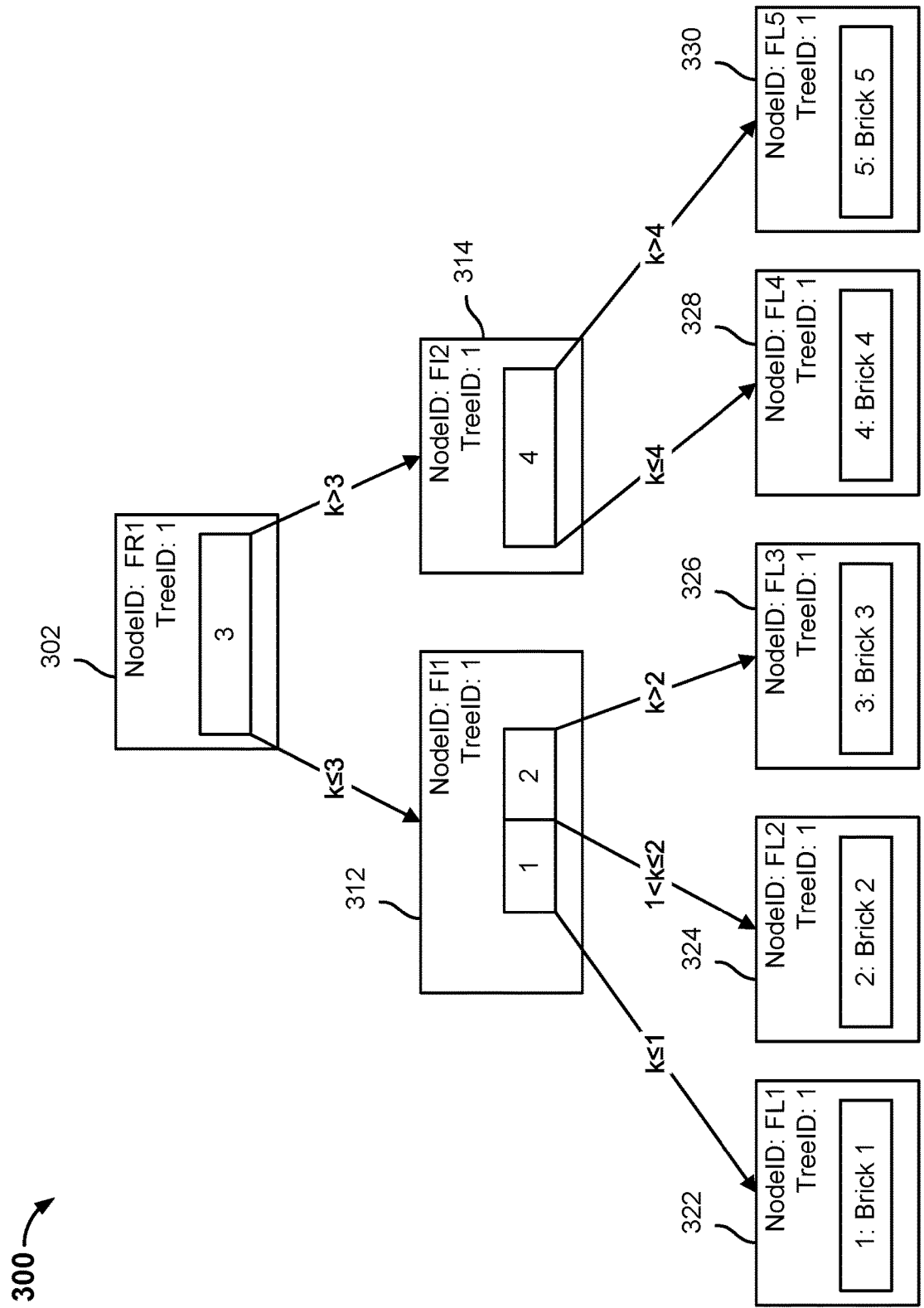
FIG. 3A is a block diagram illustrating an embodiment of a tree data structure.

FIG. 3A is a block diagram illustrating an embodiment of a tree data structure. In some embodiments, tree data structure 300 may be created by a storage system, such as storage cluster 112. In the example shown, tree data structure 300 corresponds to a file and stores the metadata associated with the file. For example, tree data structure 300 may correspond to a virtual machine container file and may be used to store virtual machine file system metadata. The metadata associated with a file is stored by a storage system as a file separate from the file with which the metadata is associated, that is, the tree data structure is stored separately from a file. A leaf node of a snapshot tree associated with file system data, such as a leaf node of tree data structures 200, 250, 255, may include a pointer to a tree data structure corresponding to a file, such as tree data structure 300. A tree data structure corresponding to a file (i.e., a "file metadata tree") is a snapshot tree, but may be used to organize the data blocks associated with a file that are stored on the storage cluster. Tree data structure 300 may be referred to as a "metadata structure" or a "snapshot structure."

A tree data structure corresponding to a content file at a particular point in time (e.g., a particular version) may be comprised of a root node, one or more levels of one or more intermediate nodes, and one or more leaf nodes. In some embodiments, a tree data structure corresponding to a content file is comprised of a root node and one or more leaf nodes without any intermediate nodes. Tree data structure 300 may be a snapshot of a content file at a particular point in time t, for example at time to. A tree data structure associated with file system data may include one or more pointers to one or more tree data structures corresponding to one or more content files.

In the example shown, tree data structure 300 includes a file root node 302, file intermediate nodes 312, 314, and file leaf nodes 322, 324, 326, 328, 330. Although tree data structure 300 includes one intermediate level between root node 302 and leaf nodes 322, 324, 326, 328, 330, any number of intermediate levels may be implemented. Similar of the snapshot trees described above, each node may include a "NodeID" that identifies the node and a "TreeID" that identifies a snapshot/view with which the node is associated.

In the example shown, root node 302 includes a pointer to intermediate node 312 and a pointer to intermediate node 314. Root node 302 includes a NodeID of "FR1" and a TreeID of "1." The NodeID identifies the name of the node. The TreeID identifies the snapshot/view with which the node is associated.

In the example shown, intermediate node 312 includes a pointer to leaf node 322, a pointer to leaf node 324, and a pointer to leaf node 326. Intermediate node 312 includes a NodeID of "FI1" and a TreeID of "1." Intermediate node 312 includes a first node key and a second node key. The data key k for leaf node 322 is a value that is less than or equal to the first node key. The data key for leaf node 324 is a value that is greater than the first node key and less than or equal to the second node key. The data key for leaf node 326 is a value that is greater than the second node key. The pointer to leaf node 322 indicates that traversing tree data structure 300 from intermediate node 312 to leaf node 322 will lead to the node with a data key of "1." The pointer to leaf node 324 indicates that traversing tree data structure 300 from intermediate node 312 to leaf node 324 will lead to the node with a data key of "2." The pointer to leaf node 326 indicates that traversing tree data structure 300 from intermediate node 312 to leaf node 326 will lead to the node with a data key of "3."

In the example shown, intermediate node 314 includes a pointer to leaf node 328 and a pointer to leaf node 330. Intermediate node 314 includes a NodeID of "FI2" and a TreeID of "1." Intermediate node 314 includes a node key. The data key k for leaf node 328 is a value that is less than or equal to the node key. The data key for leaf node 330 is a value that is greater than the node key. The pointer to leaf node 328 indicates that traversing tree data structure 300 from intermediate node 314 to leaf node 328 will lead to the node with a data key of "4." The pointer to leaf node 330 indicates that traversing tree data structure 300 from intermediate node 314 to leaf node 330 will lead to the node with a data key of "5."

Leaf node 322 includes a data key-value pair of "1: Brick 1." "Brick 1" is a brick identifier that identifies the data brick containing one or more data chunks associated with a content file corresponding to tree data structure 300. Leaf node 322 includes NodeID of "FL1" and a TreeID of "1." To view the value associated with a data key of "1," tree data structure 300 is traversed from root node 302 to intermediate node 312 to leaf node 322.

Leaf node 324 includes a data key-value pair of "2: Brick 2." "Brick 2" is a brick identifier that identifies the data brick containing one or more data chunks associated with a content file corresponding to tree data structure 300. Leaf node 324 includes NodeID of "FL2" and a TreeID of "1." To view the value associated with a data key of "2," tree data structure 300 is traversed from root node 302 to intermediate node 312 to leaf node 324.

Leaf node 326 includes a data key-value pair of "3: Brick 3." "Brick 3" is a brick identifier that identifies the data brick containing one or more data chunks associated with a content file corresponding to tree data structure 300. Leaf node 326 includes NodeID of "FL3" and a TreeID of "1." To view the value associated with a data key of "3," tree data structure 300 is traversed from root node 302 to intermediate node 312 to leaf node 326.

Leaf node 328 includes a data key-value pair of "4: Brick 4." "Brick 4" is a brick identifier that identifies the data brick containing one or more data chunks associated with a content file corresponding to tree data structure 300. Leaf node 328 includes NodeID of "FL4" and a TreeID of "1." To view the value associated with a data key of "4," tree data structure 300 is traversed from root node 302 to intermediate node 314 to leaf node 328.

Leaf node 330 includes a data key-value pair of "5: Brick 5." "Brick 5" is a brick identifier that identifies the data brick containing one or more data chunks associated with a content file corresponding to tree data structure 300. Leaf node 330 includes NodeID of "FL5" and a TreeID of "1." To view the value associated with a data key of "5," tree data structure 300 is traversed from root node 302 to intermediate node 314 to leaf node 330.

A file, such as a virtual machine container file, may be comprised of a plurality of data chunks. A brick may store one or more data chunks. A virtual machine container file is comprised of a plurality of virtual machine content files and metadata associated with the plurality of content files. Some of the bricks of the file correspond to the plurality of virtual machine content files and some of the bricks of the file correspond to the metadata associated with the plurality of content files. In the example shown, leaf nodes 322, 324, 326, 328, 330 each store a corresponding brick identifier. A data brick may be associated with one or more chunk identifiers (e.g., SHA-1). A chunk metadata table may store information that associates a brick identifier with one or more chunk identifiers and one or more chunk file identifiers. A chunk file metadata table may associate a chunk file identifier with a chunk file storing a plurality of data chunks. The chunk metadata table and the chunk file metadata table may be used, based on a brick identifier, to locate the data chunks associated with the file corresponding to the file metadata tree. A metadata store may include a data structure that matches a brick identifier with a corresponding location (physical location) of the one or more data chunks comprising the brick.

Figure 3B:
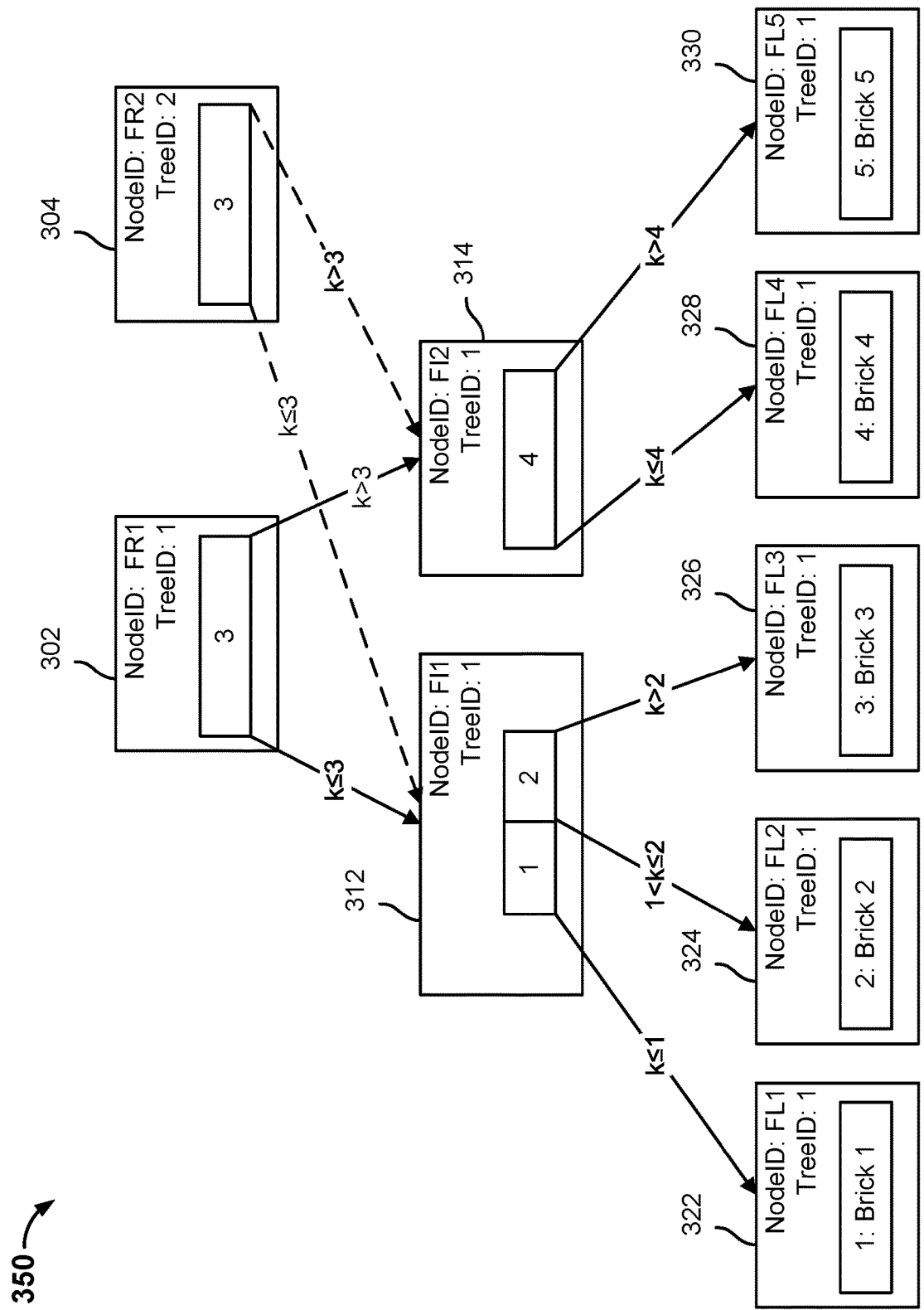
FIG. 3B is a block diagram illustrating an embodiment of adding a file metadata tree to a tree data structure.

FIG. 3B is a block diagram illustrating an embodiment of adding a file metadata tree to a tree data structure. In some embodiments, tree data structure 350 may be created by a storage system, such as storage cluster 112. A tree data structure corresponding to a file, such as a content file, is a snapshot tree, but stores metadata associated with the file (e.g., the metadata associated with the content file). In some embodiments, the content file corresponds to a virtual machine container file and the file metadata tree corresponding to the virtual machine container file is configured to store the metadata associated with the virtual machine container file.

The tree data structure corresponding to a file can be used to capture different versions of the file (e.g., version of a file backed up from a primary system or a version of a file generated by a storage cluster) at different moments in time. In some embodiments, the tree data structure allows a chain of file metadata trees corresponding to different versions of a file to be linked together by allowing a node of a later version of a file metadata tree to reference a node of a previous version of a file metadata tree. A file metadata tree is comprised of a root node, one or more levels of one or more intermediate nodes, and one or more leaf nodes.

A root node or an intermediate node of a version of a file metadata tree may reference an intermediate node or a leaf node of a previous version of a file metadata tree. Similar to the snapshot tree structure, the file metadata tree structure allows different versions of file data to share nodes and allows changes to a content file to be tracked. When a backup snapshot is received, a root node of the file metadata tree may be linked to one or more intermediate nodes associated with a previous file metadata tree. This may occur when the file is included in both backup snapshots.

In the example shown, tree data structure 350 includes a first file metadata tree comprising root node 302, intermediate nodes 312, 314, and leaf nodes 322, 324, 326, 328, and 330. Tree data structure 350 also includes a second file metadata tree that may be a snapshot of file data at a particular point in time t+n, for example at time $t_1$. The second file metadata tree is comprised of root node 304, intermediate nodes 312, 314, and leaf nodes 322, 324, 326, 328, and 330. The first file metadata tree may correspond to a first version of a virtual machine container file and the second file metadata tree may correspond to a second version of the virtual machine container file.

To create a snapshot of the file data at time t+n, a new root node is created. The new root node includes the same set of pointers as the original node. In the example shown, root node 304 includes a set of pointers to intermediate nodes 312, 314, which are intermediate nodes associated with a previous snapshot. The new root node also includes a different NodeID and a different TreeID. The TreeID is the view identifier associated with a view of the file metadata tree at a particular moment in time. In some embodiments, root node 304 is associated with a current view of the file data. The current view may represent a state of the file data that is up-to-date and is capable of receiving one or more modifications to the file metadata tree that correspond to modifications to the file data. The TreeID of a root node indicates a snapshot with which the root node is associated. For example, root node 302 with a TreeID of "1" is associated with a first backup snapshot and root node 304 with a TreeID of "2" is associated with a second backup snapshot. In other embodiments, root node 304 is associated with a snapshot view of the file data. A snapshot view may represent a state of the file data at a particular moment in time in the past and is not updated.

In the example shown, root node 304 is a copy of root node 302. Similar to root node 302, root node 304 includes the same pointers as root node 302. Root node 304 includes a first set of pointers to intermediate node 312. The first set of pointers associated with a data key (e.g., "1," "2," or "3") less than or equal to the node key indicates that traversing a file metadata tree included in tree data structure 350 from root node 304 to intermediate node 312 will lead to a leaf node with a data key of "1," "2," or "3." Root node 304 includes a second set of pointers to intermediate node 314. The second set of pointers associated with a data key greater than the node key indicates that traversing a file metadata tree included in tree data structure 350 from root node 304 to intermediate node 314 will lead to a leaf node with a data key of "4" or "5." Root node 304 includes a NodeID of "FR2" and a TreeID of "2." The NodeID identifies the name of the node. The TreeID identifies the backup snapshot with which the node is associated.

Figure 3C:
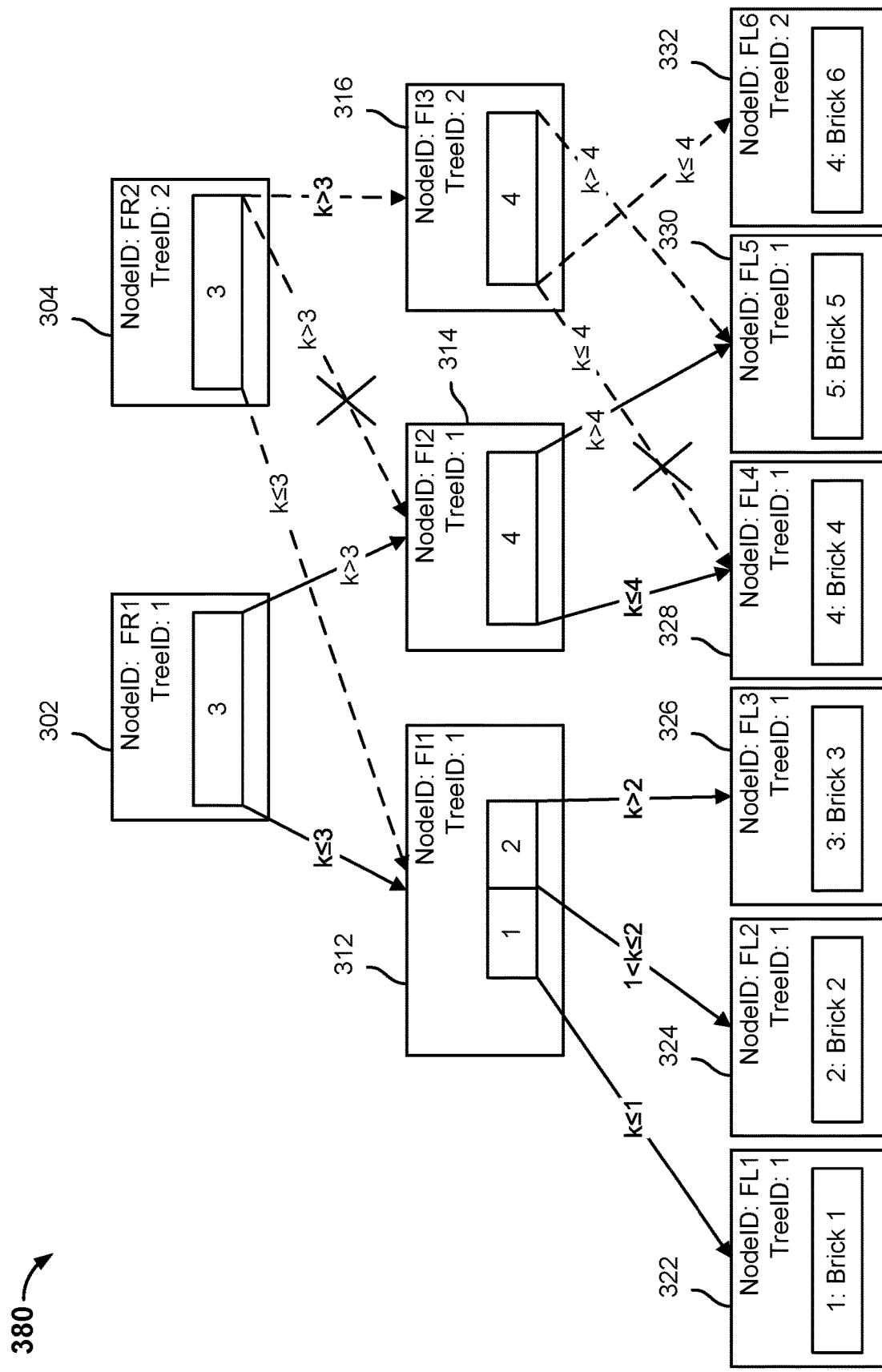
FIG. 3C is a block diagram illustrating an embodiment of modifying a file metadata tree of a tree data structure.

FIG. 3C is a block diagram illustrating an embodiment of modifying a file metadata tree of a tree data structure. In the example shown, tree data structure 380 may be modified by a file system manager, such as file system manager 115. A file metadata tree with root node 304 may be a current view of the file data at time t+n+m, for example, at time $t_2$. A current view may represent a state of the file data that is up-to-date and capable of receiving one or more modifications to the file metadata tree that correspond to modifications to the file system data. Because a snapshot represents a perspective of the file data that is "frozen" in time, one or more copies of one or more nodes affected by a change to file data are made.

In some embodiments, the file data may be modified such that one of the data chunks is replaced by another data chunk. When a data chunk of file data associated with a previous backup snapshot is replaced with a new data chunk, the data brick storing the data chunk may be different. A leaf node of a file metadata tree stores a brick identifier associated with a particular brick containing the data chunk. To represent this modification to the file data, a corresponding modification is made to a current view of a file metadata tree. The current view of the file metadata tree is modified because the previous file metadata tree is a snapshot view and can no longer be modified. The data chunk of the file data that was replaced has a corresponding leaf node in the previous file metadata tree. A new leaf node in the current view of the file metadata tree is created, as described herein, that corresponds to the new data chunk. The new leaf node includes an identifier associated with the current view. The new leaf node may also store the chunk identifier associated with the modified data chunk.

In the example shown, a data chunk included in "Brick 4" has been modified. The data chunk included in "Brick 4" has been replaced with a data chunk included in "Brick 6." At $t_2$, the file system manager starts at root node 304 because that is the root node associated with the file metadata tree at time $t_2$. The value "Brick 4" is associated with the data key "4." The file system manager traverses tree data structure 380 from root node 304 until it reaches a target node, in this example, leaf node 328. The file system manager compares the TreeID at each intermediate node and leaf node with the TreeID of the root node. In the event the TreeID of a node matches the TreeID of the root node, the file system manager proceeds to the next node. In the event the TreeID of a node does not match the TreeID of the root node, a shadow copy of the node with the non-matching TreeID is made. For example, to reach a leaf node with a data key of "4," the file system manager begins at root node 304 and proceeds to intermediate node 314. The file system manager compares the TreeID of intermediate node 314 with the TreeID of root node 304, determines that the TreeID of intermediate node 314 does not match the TreeID of root node 304, and creates a copy of intermediate node 314. The intermediate node copy 316 includes the same set of pointers as intermediate node 314, but includes a TreeID of "2" to match the TreeID of root node 304. The file system manager updates a pointer of root node 304 to point to intermediate node 316 instead of pointing to intermediate node 314. The file system manager traverses tree data structure 380 from intermediate node 316 to leaf node 328, determines that the TreeID of leaf node 328 does not match the TreeID of root node 304, and creates a copy of leaf node 328. Leaf node 332 is a copy of leaf node 328, but stores the brick identifier "Brick 6" and includes the same TreeID as root node 304. The file system manager updates a pointer of intermediate node 316 to point to leaf node 332 instead of pointing to leaf node 328.

Figure 3D:
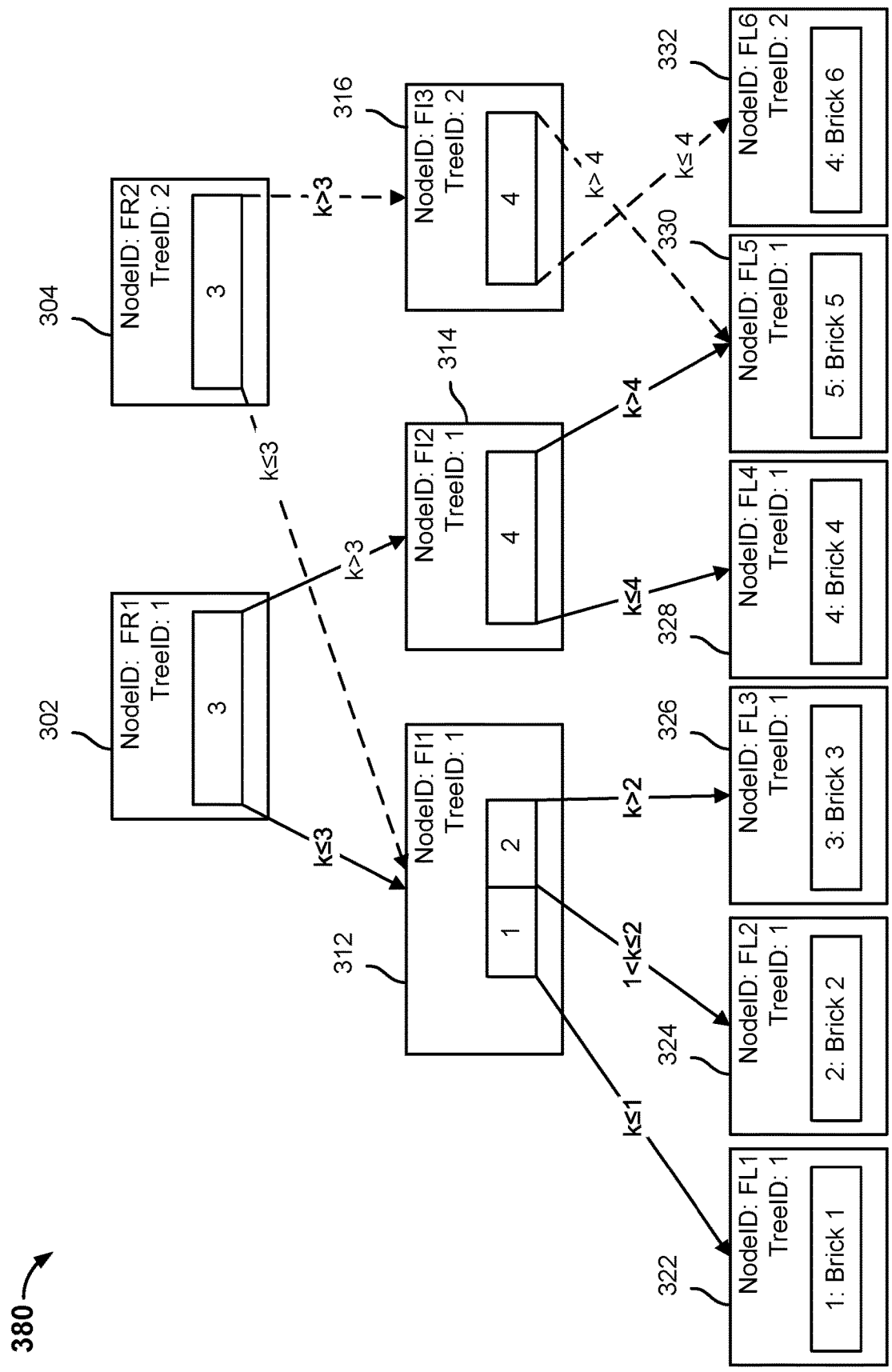
FIG. 3D is a block diagram illustrating an embodiment of a modified file metadata tree.

FIG. 3D is a block diagram illustrating an embodiment of a modified file metadata tree. The file metadata tree 380 shown in FIG. 3D illustrates a result of the modifications made to file metadata tree 380 as described with respect to FIG. 3C.

Figure 4A:
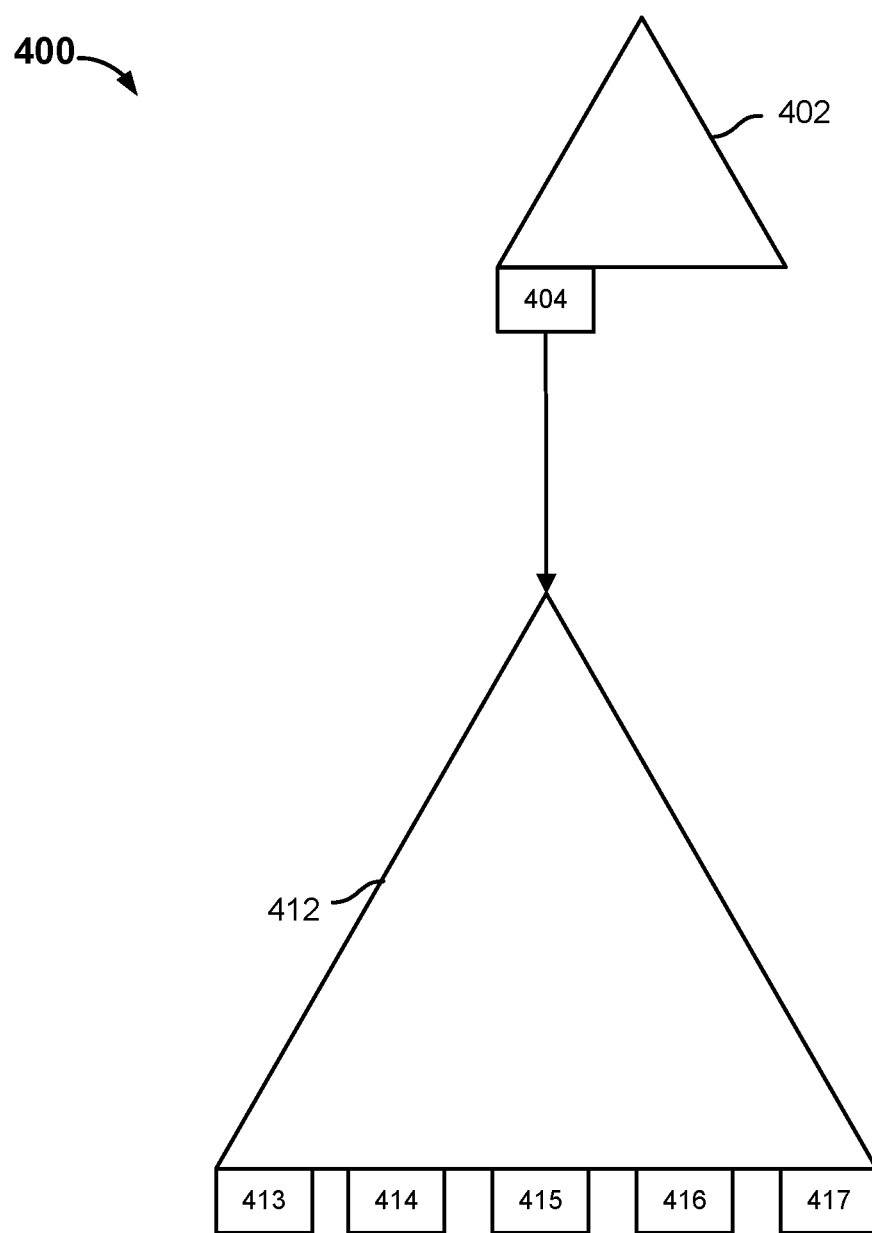
FIG. 4A is a diagram illustrating an embodiment of a view of file system data.

FIG. 4A is a diagram illustrating an embodiment of a view of file system data. In the example shown, file system data view 400 may be generated by a file system manager, such as file system manager 115.

File system data view 400 may correspond to a first backup snapshot of file system data. File system data view 400 includes a snapshot tree 402 and file metadata tree 412. Snapshot tree 402 includes leaf node 404. Leaf node 404 includes a pointer to a root node of file metadata tree 412. Snapshot tree 402 may include other leaf nodes that are not shown for explanation purposes. The other leaf nodes may include pointers to other corresponding file metadata trees.

File metadata tree 412 is configured to store the metadata associated with a first version of a content file. The content file may correspond to a virtual machine container file. File metadata tree includes leaf nodes 413, 414, 415, 416, 417. Each leaf node has a corresponding identifier of a data brick containing one or more data chunks of the content file or a corresponding pointer to the data brick containing the one or more data chunks of the content file.

Figure 4B:
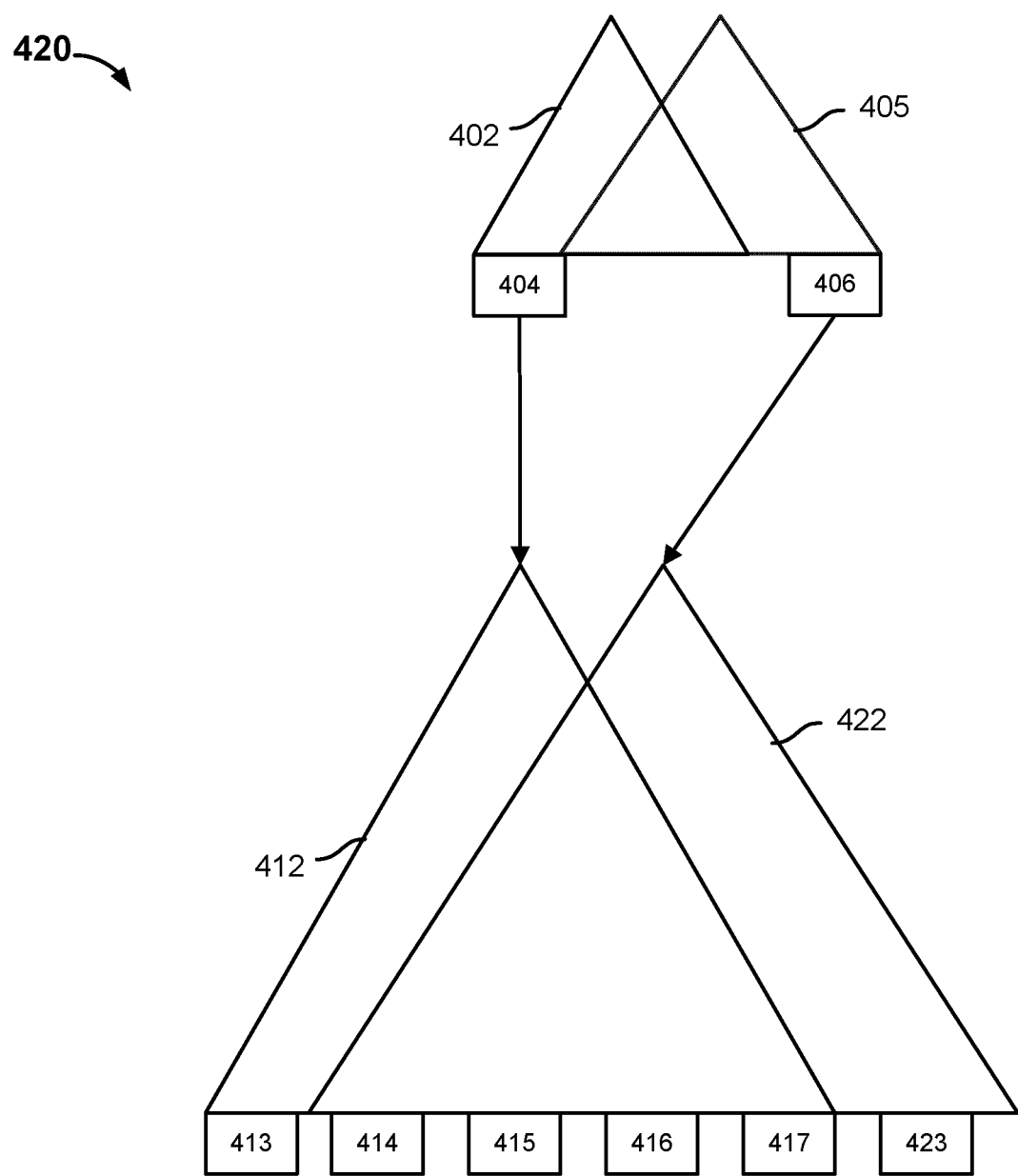
FIG. 4B is a diagram illustrating an embodiment of a view of file system data.

FIG. 4B is a diagram illustrating an embodiment of a view of file system data. In the example shown, file system data view 420 may be generated by a file system manager, such as file system manager 115.

In the example shown, file system data view 420 may correspond to a second backup snapshot (e.g., an incremental backup snapshot) of file system data. File system data view 420 is illustrated next to file system data view 400. File system data view 420 includes a snapshot tree 405 and file metadata tree 422. Snapshot tree 404 includes one or more nodes that are shared with snapshot tree 402. Snapshot tree 404 includes leaf node 406, which is a leaf node not shared with snapshot tree 402. Leaf node 406 includes a pointer to a root node of file metadata tree 422. Snapshot tree 404 may include other leaf nodes that are not shown for explanation purposes. The other leaf nodes may include pointers to other corresponding file metadata trees.

File metadata tree 422 is configured to store the metadata associated with a second version of the content file. File metadata tree 422 includes leaf nodes 414, 415, 416, 417, 423. Some of the data associated with the content file corresponding to file metadata tree 422 has not changed since the last backup snapshot. In this example, the data associated with leaf nodes 414, 415, 416, 417 has not changed since the first backup snapshot. The data associated with leaf node 423 has been added in the second version of the content file.

Leaf node 423 is associated with data that was not included in the first backup snapshot of file system data. Leaf node 423 may be determined to be associated with the second backup snapshot by traversing the snapshot tree associated with the second backup snapshot. Snapshot tree 404 is the snapshot tree associated with the second backup snapshot. Snapshot tree 404 may be traversed to leaf node 406, which includes a pointer to the root node of file metadata tree 422. File metadata tree 422 may be traversed to each of the leaf nodes. Each leaf node of file metadata tree 422 has an associated view identifier. In the event the view identifier associated with a leaf node matches the view identifier associated with the root node of the file metadata tree, the data associated with the leaf node is determined to be associated with the second backup snapshot, that is, the data was added to the primary system since the first backup snapshot. In some embodiments, the file corresponding to file metadata tree 422 has been modified to include one or more data chunks associated with leaf node 423 instead of the one or more data chunks associated with leaf node 413. The one or more data chunks associated with leaf node 423 may be an encrypted version of the one or more data chunks associated with leaf node 413.

The size of the data associated with leaf node 423 is the amount of data that has changed since a first backup snapshot. This amount for the second backup snapshot may be compared to a historical rate, trending rate, and/or seasonality rate to determine whether the content file corresponding to file metadata tree 422 has been potentially infected with malicious software (e.g., ransomware).

Figure 4C:
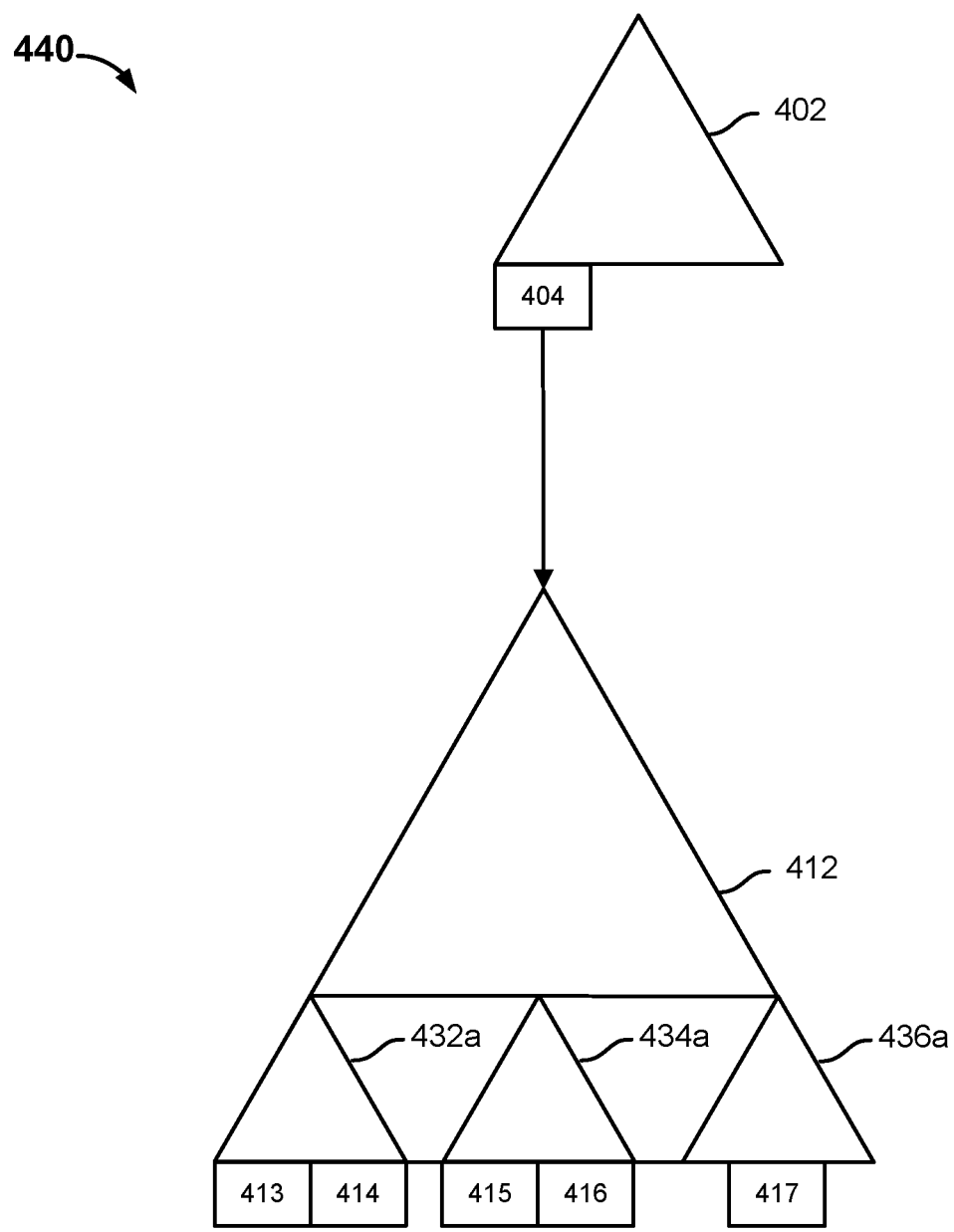
FIG. 4C is a diagram illustrating an embodiment of a view of file system data.

FIG. 4C is a diagram illustrating an embodiment of a view of file system data. In the example shown, file system data view 440 may be generated by a file system manager, such as file system manager 115.

File system data view 440 is similar to file system data view 400 except that file system data view 440 illustrates sub-portions 432a, 434a, 436a of file metadata tree 412. Sub-portion 432a may correspond to the metadata associated with a first portion of a first version of the content file, sub-portion 434a may correspond to the metadata associated with a second portion of the first version of the content file, and sub-portion 436a may correspond to the metadata associated with a third portion of the first version of the content file.

Sub-portion 432a is associated with leaf nodes 413, 414, sub-portion 434a is associated with leaf nodes 415, 416, and sub-portion 436a is associated with leaf node 417. Each leaf node has a corresponding identifier of a data brick storing one or more data chunks of the content file or a corresponding pointer to the data brick storing the one or more data chunks of the content file.

Figure 4D:
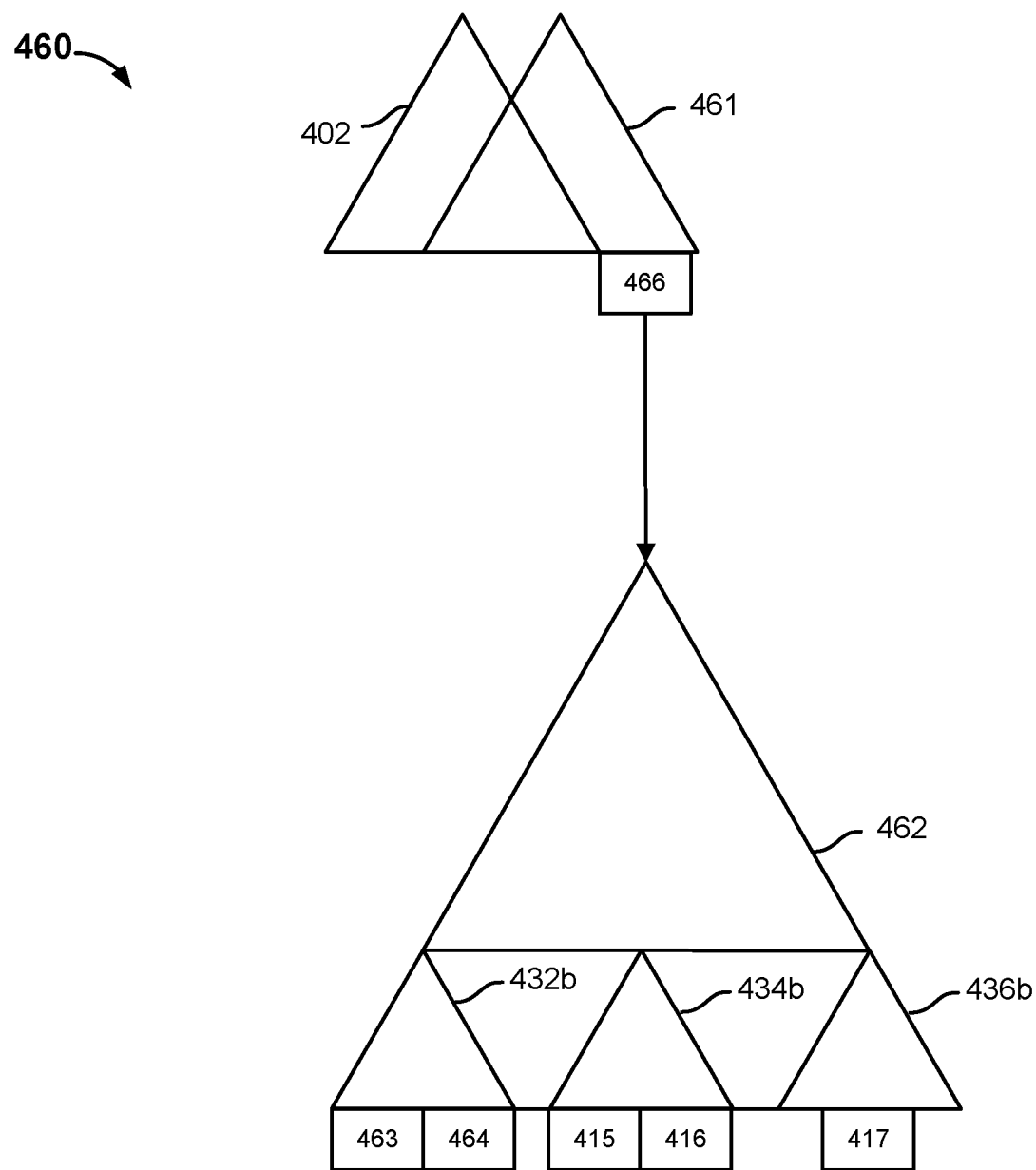
FIG. 4D is a diagram illustrating an embodiment of a view of file system data.

FIG. 4D is a diagram illustrating an embodiment of a view of file system data. In the example shown, file system data view 460 may be generated by a file system manager, such as file system manager 115.

In the example shown, file system data view 460 may correspond to a second backup snapshot (e.g., incremental backup snapshot) of file system data. File system data view 460 includes snapshot tree 461 and file metadata tree 462. Snapshot tree 461 includes one or more nodes that are shared with snapshot tree 402. Snapshot tree 461 includes leaf node 466, which is a leaf node not shared with snapshot tree 402. Leaf node 466 includes a pointer to a root node of file metadata tree 462. Snapshot tree 461 may include other leaf nodes that are not shown for explanation purposes. The other leaf nodes may include pointers to other corresponding file metadata trees.

File metadata tree 412 (not shown, but depicted in FIG. 4C) is configured to store the metadata associated with a first version of a content file. File metadata tree 462 is configured to store the metadata associated with a second version of the content file. File metadata tree 462 includes one or more nodes that are shared with file metadata tree 412. For example, leaf nodes 415, 416, 417 are shared with file metadata tree 412.

Similar to file metadata tree 412, file metadata tree 462 includes sub-portions 432b, 434b, 436b. Sub-portion 432b may correspond to the metadata associated with a first portion of a second version of the content file, sub-portion 434b may correspond to the metadata associated with a second portion of the second version of the content file, and sub-portion 436b may correspond to the metadata associated with a third portion of the second version of the content file.

Sub-portion 432b is associated with leaf nodes 463, 464, sub-portion 434b is associated with leaf nodes 415, 416, and sub-portion 436b is associated with leaf node 417. Each leaf node has a corresponding identifier of a data brick storing one or more data chunks of the content file or a corresponding pointer to the data brick storing the one or more data chunks of the content file.

In the example shown, the leaf nodes 413, 414 associated with sub-portion 432a have been modified to be leaf nodes 463, 464. A data brick includes one or more data chunks. The data bricks associated with leaf nodes 463, 464 are different from the data bricks associated with leaf nodes 413, 414. This indicates that the data chunks associated with leaf nodes 413, 414 have been modified since the first backup snapshot. Meanwhile, the data chunks associated with leaf nodes 415, 416, 417 have not changed since the first backup snapshot.

The one or more data chunks associated with leaf nodes 463, 464 may be an encrypted version of the one or more data chunks associated with leaf nodes 413, 414.

The portions of a content file that have changed between backup snapshots may be determined by traversing different versions of file metadata trees corresponding to a content file. For example, snapshot tree 461 may be traversed to leaf node 466, which includes a pointer to the root node of file metadata tree 462. File metadata tree 462 may be traversed to each of the leaf nodes. Each leaf node of file metadata tree 462 has an associated view identifier. In the event the view identifier associated with a leaf node matches the view identifier associated with the root node of the file metadata tree, the data associated with the leaf node is determined to be associated with the second backup snapshot, that is, the data was added to the primary system since the first backup snapshot.

The size of the data associated with leafs node 463, 464 is the amount of data that the first sub-portion has changed since the first backup snapshot. This amount for the second backup snapshot may be compared to a historical rate associated with the first sub-portion, trending rate associated with the first sub-portion, and/or seasonality rate associated with the first sub-portion to determine whether the content file corresponding to file metadata tree 422 has been potentially infected with malicious software.

Figure 5:
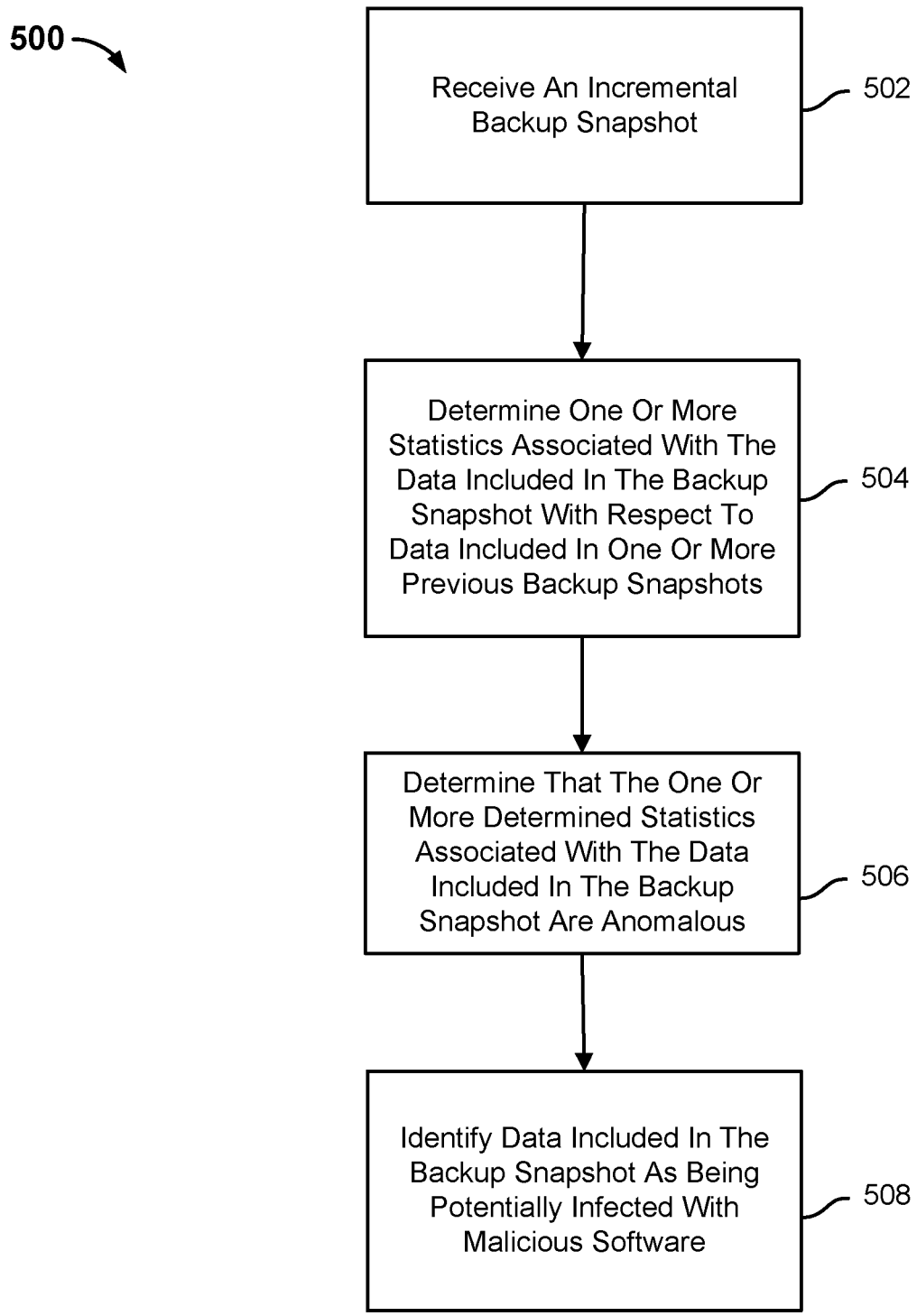
FIG. 5 is a flow chart illustrating a process for detecting malicious software in accordance with some embodiments.

FIG. 5 is a flow chart illustrating a process for detecting malicious software in accordance with some embodiments. In the example shown, process 500 may be implemented by a storage cluster, such as storage cluster 112.

At 502, an incremental backup snapshot is received from a primary system. The incremental backup snapshot includes file system data associated with the primary system. The file system data may include data associated with a version of a content file (e.g., virtual machine container file). The incremental backup snapshot may include the state of the primary system that has changed since a last backup snapshot. The primary system may include a change block tracker that is configured to identify the one or more data blocks associated with the primary system that have changed since a previous backup snapshot. The primary system may be configured to send the one or more identified blocks to the storage cluster when performing an incremental backup. The storage cluster may be configured to generate a tree data structure based on the data included in the incremental backup snapshot. The tree data structure may be comprised of a snapshot tree and one or more file metadata trees.

At 504, one or more statistics associated with the data included in the backup snapshot are determined with respect to data included in one or more previous backup snapshots. For example, an amount of data change associated with the backup snapshot is determined with respect to one or more previous backup snapshots. In some embodiments, the amount of data change associated with a version of a content file (e.g., version of a file backed up from a primary system or a version of a file generated by a storage cluster) with respect to previous versions of the content file is determined (e.g., one or more previously backed up versions of a file or one or more previous versions of a file generated by a storage cluster). In some embodiments, an amount of deduplication associated with a backup snapshot is determined. In some embodiments, the number of files included in a backup snapshot that were added, deleted, or modified is determined. In some embodiments, an entropy of the changed data associated with the files included in the backup snapshot is determined.

In some embodiments, the total amount of data that is included in the backup snapshot is compared to the corresponding amounts of data that are included in one or more previous backup snapshots.

In some embodiments, the file metadata tree associated with a version of the content file is compared to previous file metadata trees associated with previous versions of the content file to determine the amount of data change associated with a version of a content file with respect to previous versions of the content file. The file metadata tree associated with the version of the content file may include one or more leaf nodes that are included in previous file metadata trees and one or more leaf nodes that are not included in the previous file metadata trees. The file metadata tree associated with the version of the content file may be traversed to identify the one or more leaf nodes that are not included in previous file metadata trees. The one or more leaf nodes that are not included in previous file metadata trees may be identified based on a view identifier associated with the leaf nodes. The one or more leaf nodes that are not included in the previous file metadata trees may include corresponding identifiers of data bricks containing data chunks of the content file or corresponding pointers to the data bricks containing data chunks of the content file. The data chunks of the content file have an associated size. The associated size may represent the amount that the content file has changed since a last backup snapshot. The one or more previous file metadata trees associated with the content file may be traversed to determine an amount of change of the content file per backup snapshot.

In other embodiments, specific portions of a version of a content file are analyzed and compared to other versions of the specific portions of the content file. For example, particular portions of a file (e.g., file permissions, file name) normally do not change between backup snapshots. However, a file infected with malicious software may be more likely to have those portions of the file modified. The rate of change associated with specific portions of a file per backup snapshot may be analyzed to determine whether the file has been potentially infected with malicious software. The file metadata trees associated with the file may be traversed to determine whether a sub-portion of the file metadata tree has experienced an abnormal amount of change.

At 506, it is determined that the one or more determined statistics associated with the data included in the backup snapshot are anomalous.

In some embodiments, the amount of data associated with a backup snapshot may be compared to a historical amount of data (e.g., average, moving average) associated with one or more previous backup snapshots. In the event the amount of data associated with the backup snapshot exceeds the historical amount of data associated with one or more previous backup snapshots by a threshold (e.g., certain amount, certain percentage, more than one standard deviation, any other statistical measure), the backup snapshot may be indicated (e.g., flagged) as being potentially infected by malicious software.

In some embodiments, the rate at which the data associated with a file has changed for a backup snapshot may be compared to a historical rate (e.g., average, moving average) at which the data associated with the file has changed. For example, the amount of change associated with a file may fluctuate at any time of the year. The average rate of change per backup snapshot for the file may be determined. The rate at which the file has changed for a particular backup snapshot may be compared to the average rate of change per backup snapshot. In the event the rate at which the data associated with the file has changed for a particular backup snapshot is greater than the historical rate of change per backup snapshot by a threshold (e.g., certain amount, certain percentage, more than one standard deviation, any other statistical measure), the file may be indicated (e.g., flagged) as being potentially infected by malicious software.

In other embodiments, the amount of deduplication associated with the backup snapshot is considered when determining whether the total amount of data associated with a backup snapshot is anomalous. In the event deduplication was not possible for some of the changed portion (e.g., greater than a first percentage or amount of the file system data included in the backup snapshot), the backup snapshot may be indicated (e.g., flagged) as being potentially infected with malicious software because this indicates that the data chunks associated with the backup snapshot are encrypted. In the event deduplication is possible for some of the changed portion (e.g., less than a second percentage or amount of the file system data included in the backup snapshot), the file may be determined to have not been infected with malicious software because this indicates that the data chunks associated with the changed portion are not encrypted. In some embodiments, the first percentage or amount of the file system data is the same as the second percentage of the file system data. In other embodiments, the first percentage or amount of the file system data is different than the second percentage or amount of the file system data.

In other embodiments, the amount of deduplication associated with the content file is considered when determining whether the amount of data change associated with a version of the content file is anomalous. A file may undergo a large amount of change since a last backup snapshot. Portions of the file that have changed may be analyzed to determine whether deduplication has occurred with respect to the changed portion. For example, a leaf node associated with a file metadata tree may include a pointer to a data brick that is shared by another file (i.e., a leaf node associated with a second file metadata tree corresponding to a second file includes a pointer to the data brick). In the event deduplication was not possible for some of the changed portion (e.g., greater than a first percentage or amount of the file data included in the backup snapshot), the file may be indicated (e.g., flagged) as being potentially infected with malicious software because this indicates that the data chunks associated with the changed portion are encrypted. In the event deduplication is possible for some of the changed portion (e.g., less than a second percentage or amount of the file data included in the backup snapshot), the file may be determined to have not been infected with malicious software because this indicates that the data chunks associated with the changed portion are not encrypted. In some embodiments, the first percentage or amount of the file data is the same as the second percentage of the file data. In other embodiments, the first percentage or amount of the file data is different than the second percentage or amount of the file data.

In other embodiments, specific portions of a file are analyzed. For example, particular portions of a file (e.g., file permissions, file name) normally do not change between backup snapshots. However, a file infected with malicious software is likely to have those portions of the file modified. The rate of change associated with specific portions of a file may be analyzed to determine whether the file has been potentially infected with malicious software. The file metadata trees associated with the file may be traversed to determine whether a sub-portion of the file metadata tree has experienced an abnormal amount of change. In the event the rate at which a particular portion of the file has changed for a particular backup snapshot is greater than the historical rate of change per backup snapshot (e.g., average, moving average) by a threshold (e.g., certain amount, certain percentage, more than one standard deviation, any other statistical measure), the file may be indicated as being potentially infected by malicious software. In the event the rate at which a particular portion of the file has changed for a particular backup snapshot is greater than the expected rate of change for the particular time of year (e.g., seasonality rate) by a threshold (e.g., certain amount, certain percentage, more than one standard deviation, any other statistical measure), the file may be indicated as being potentially infected by malicious software. In the event the rate at which the particular portion of the file has changed for a particular backup snapshot is greater than the trending rate for the particular time period by a threshold (e.g., certain amount, certain percentage, more than one standard deviation, any other statistical measure), the file may be indicated as being potentially infected by malicious software.

Other factors, such as historical trends and seasonality, may be taken into consideration before determining that a version of the file may have been infected with malicious software. For example, the amount of data associated with a backup snapshot may be compared to a trend amount of data associated with one or more previous backup snapshots. In the event the amount of data associated with the backup snapshot exceeds the trend amount of data associated with one or more previous backup snapshots by a threshold (e.g., certain amount, certain percentage, more than one standard deviation, any other statistical measure), the backup snapshot may be indicated (e.g., flagged) as being potentially infected by malicious software. The amount of data associated with a backup snapshot may be compared to a seasonal amount of data associated with one or more previous backup snapshots. In the event the amount of data associated with the backup snapshot exceeds the seasonal amount of data associated with one or more previous backup snapshots by a threshold (e.g., certain amount, certain percentage, more than one standard deviation, any other statistical measure), the backup snapshot may be indicated (e.g., flagged) as being potentially infected by malicious software.

The rate at which the data associated with a particular file has changed for a particular backup snapshot may be compared to a seasonality rate at which the data associated with the particular file has changed. In the event the rate at which the data associated with the file has changed for a particular backup snapshot is greater than the expected rate of change for the particular time of year by a threshold (e.g., certain amount, certain percentage, more than one standard deviation, any other statistical measure), the file may be indicated as potentially being infected by malicious software. The rate at which the data associated with a particular file has changed for a particular backup snapshot may be compared to a trending rate at which the data associated with the particular file has changed. The rate at which the file has changed for a particular backup snapshot may be compared to the trending rate for the particular time period. In the event the rate at which the data associated with the file has changed for a particular backup snapshot is greater than the trending rate for the particular time period by a threshold (e.g., certain amount, certain percentage, more than one standard deviation, any other statistical measure), the file may be indicated as potentially being infected by malicious software.

Using a single statistic associated with the data included in a backup snapshot to determine whether a file stored on the primary system or the actual primary system is potentially infected with malicious software may lead to a plurality of false positives (e.g., determine the file or the primary system is potentially infected with malicious software when the file or the primary system is not infected with malicious software). The number of false positives detected by the analysis server may be reduced by using a plurality of the statistics associated with the backup snapshot. For example, an amount of deduplication associated with a backup snapshot may be determined. In the event the amount of deduplication associated with the backup snapshot is greater than a deduplication threshold, the number of files included in a backup snapshot that were added, deleted, or modified may be determined. In the event the number of files included in a backup snapshot that were added, deleted, or modified is greater than a change threshold, an entropy of the changed data associated with the files included in the backup snapshot may be determined. In the event the entropy of the changed data associated with the files included in the backup snapshot is greater than an entropy threshold, one or more files included in the backup snapshot may be determined to be potentially infected with malicious software.

At 508, data included in the backup snapshot is identified as being potentially infected by malicious software. In some embodiments, the backup snapshot as a whole is identified as being potentially infected by malicious software. For example, the backup snapshot may be flagged as being potentially infected by malicious software. A metadata store storing the backup snapshot may be modified to indicate that the backup snapshot is potentially infected with malicious software. In other embodiments, a content file associated with the backup snapshot is identified as being potentially infected by malicious software. For example, a version of the content file associated with the backup snapshot may be flagged as being potentially infected by malicious software. A leaf node of a snapshot tree pointing to the file metadata tree corresponding to the version of the potentially infected content file may be modified to include a value that indicates the file metadata tree corresponding to the version of the potentially infected content file is potentially infected with malicious software.

Figure 6:
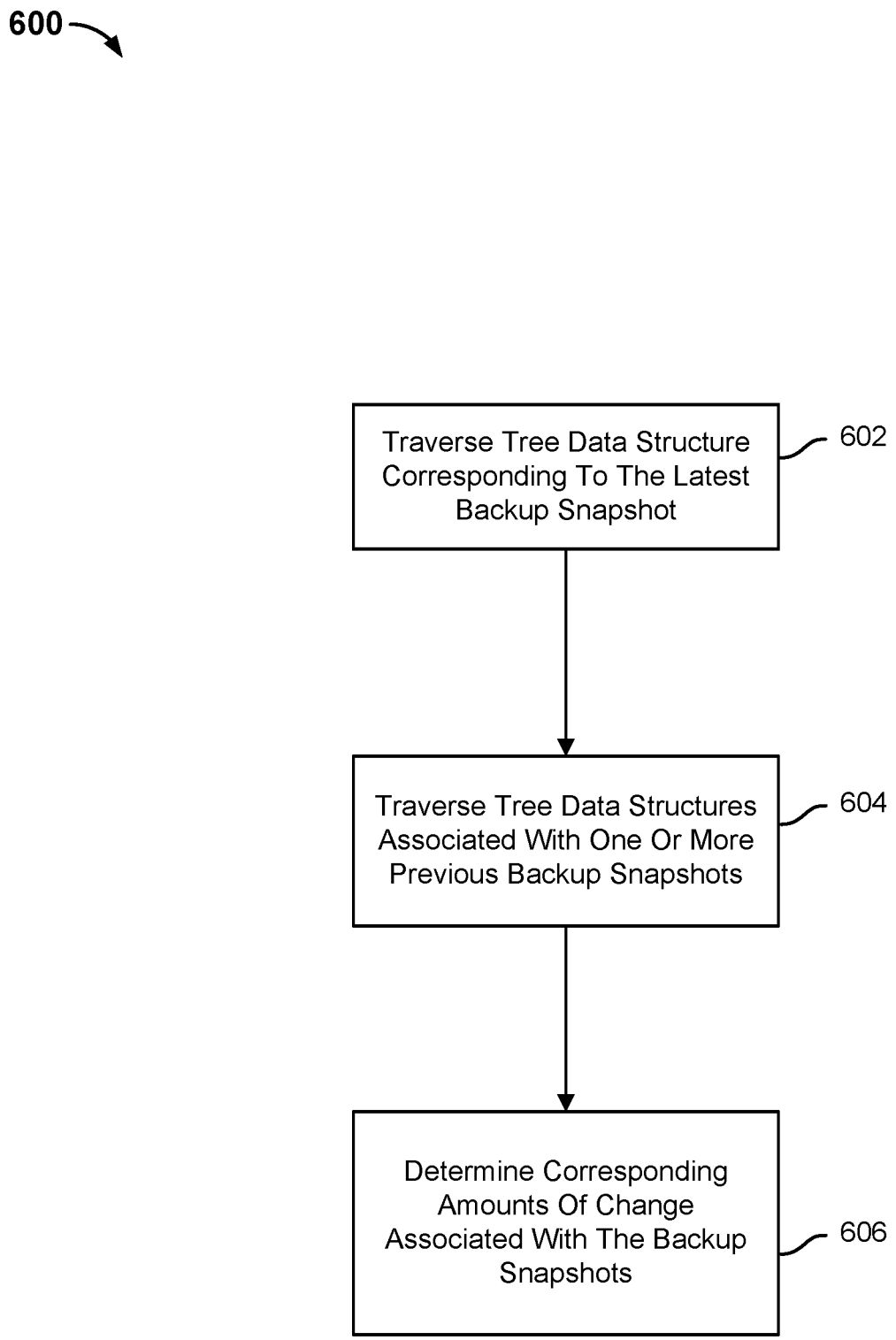
FIG. 6 is a flow chart illustrating an embodiment of a process for determining an amount of data change associated with a backup snapshot with respect to one or more previous backup snapshots.

FIG. 6 is a flow chart illustrating an embodiment of a process for determining an amount of data change associated with a backup snapshot with respect to one or more previous backup snapshots. In the example shown, process 600 may be performed by a file system manager, such as file system manager 115. Process 600 may be implemented to perform some or all of 504 of process 500.

At 602, the tree data structure corresponding to the latest backup snapshot is traversed. The tree data structure corresponding to the latest backup snapshot may be traversed from a root node associated with the tree data structure to the leaf nodes associated with the one or more file metadata trees associated with the last backup snapshot. A leaf node may be associated with the latest backup snapshot in the event the leaf node has the same view identifier as the root node associated with the latest backup snapshot. The one or more leaf nodes associated with the one or more file metadata trees associated with the last backup snapshot may be associated with one or more data chunks. The total amount of data that was added to the file system data may be determined based on the one or more data chunks.

In some embodiments, the file metadata tree corresponding to the latest version of a content file (e.g., version of a file backed up from a primary system or a version of a file generated by a storage cluster) is traversed. The file metadata tree corresponding to the latest version of the content file may be traversed to determine one or more leaf nodes shared by one or more file metadata trees corresponding to one or more previous versions of the content file and one or more leaf nodes not shared by one or more file metadata trees corresponding to one or more previous versions of the content file. The one or more leaf nodes that are not included in the previous file metadata trees may have a view identifier that matches the view identifier of the root node of the file metadata tree corresponding to the latest version of a content file. The one or more leaf nodes that are not included in the previous file metadata trees may include corresponding identifiers of data bricks containing data chunks of the content file or corresponding pointers to the data bricks containing data chunks of the content file. The data chunks associated with the new portion of the content file have an associated size. The associated size may represent the amount that the content file has changed since a last backup snapshot.

At 604, one or more tree data structures associated with one or more previous backup snapshots are traversed. A tree data structure corresponding to a previous backup snapshot may be traversed from a root node associated with the tree data structure to the one or more leaf nodes associated with the file metadata trees of the previous backup snapshot. A leaf node of a file metadata tree may be associated with the previous backup snapshot in the event the leaf node has the same view identifier as the root node associated with the previous backup snapshot. The one or more leaf nodes associated with the backup snapshot may be associated with one or more data chunks. The total amount of data that was added to the file system data for that previous backup snapshot may be determined based on the one or more data chunks.

In some embodiments, the one or more file metadata trees corresponding to the one or more previous versions of the content file are traversed to determine the one or more leaf nodes that were added to the one or more previous versions of the content file. The one or more leaf nodes that were added to the one or more previous versions may include corresponding identifiers of data bricks containing data chunks of the content file or corresponding pointers to the data bricks containing data chunks of the content file. The data chunks associated with the new portion of the content file have an associated size. The associated size may represent the amount that the content file has changed at a particular version.

At 606, corresponding amounts of change associated with the backup snapshots are determined. The corresponding amounts of data that was added for the latest backup snapshot and the one or more previous backup snapshots may be determined. One or more statistics of the data change per snapshot may be determined (e.g., ratio, percentage). For example, it may be determined that the latest backup snapshot included 50% more data than the one or more previous backup snapshots. A statistic of the total amount of data for the plurality of backup snapshots may be determined (e.g., average, moving average, median, high, low, standard deviation, etc.). For example, it may be determined that the percentage of data that is added per backup snapshot is a 10% addition per backup snapshot.

In some embodiments, corresponding amounts of change associated with the plurality of content file versions (e.g., versions of a file backed up from a primary system or versions of a file generated by a storage cluster) are determined. The size of the data chunks that have been added to a version of the file and the overall size of a version of the file may be determined. A statistical measure of the data change per snapshot may be determined (e.g., ratio, percentage). For example, it may be determined that the latest version of the content file added 50% more data to the file while the second version of the content file added 5% more data to the file. A statistical measure of the data change for a plurality of content file versions may be determined (e.g., average, moving average, median, high, low, standard deviation, etc.). For example, it may be determined that the average rate of change for the content file is a 10% change per backup snapshot.

In some embodiments, the amount of change associated with specific portions of different versions of a file are determined. When traversing the tree, it may be determined that certain sub-portions of the tree undergo change while other portions of the tree do not change. The amount that each portion of the tree undergoes change may be determined.

A statistical measure of the data change for a sub-portion of a content file per snapshot may be determined (e.g., ratio, percentage). For example, it may be determined that a sub-portion of a first version of the content file experienced a 1% change and the sub-portion of a second version of the content file experienced a 40% change.

A statistical measure of the data change for a sub-portion of the content file for a plurality of content file versions may be determined (e.g., average, moving average, median, high, low, standard deviation, etc.). For example, it may be determined that the average rate of change for a sub-portion of the content file is a 10% change per backup snapshot.

Figure 7:
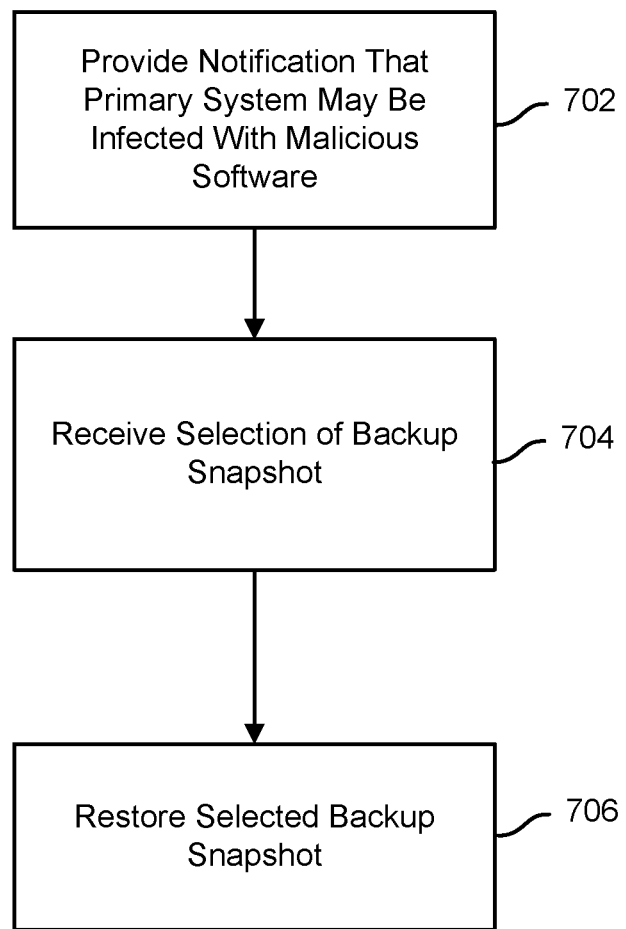
FIG. 7 is a flow chart illustrating a process for restoring a primary system that has been potentially infected with malicious software in accordance with some embodiments.

FIG. 7 is a flow chart illustrating a process for restoring a primary system that has been potentially infected with malicious software in accordance with some embodiments. In the example shown, process 700 may be implemented by a storage cluster, such as storage cluster 112.

At 702, a notification that a primary system may be infected with malicious software is provided. The notification may also provide a link to a set of one or more clean backup snapshots (e.g., a backup snapshot that has not been infected with malicious software). The notification may also provide a link to a set of one or more clean backup file versions (e.g., a version of the file that has not been infected with malicious software). A backup snapshot may be determined to be a clean backup snapshot in the event the backup snapshot does not include the data blocks that indicate a file has been potentially infected with malicious software. A version of a file may be determined to be a clean backup file in the event the backup snapshot associated with the clean file does not include the data blocks that indicate the file has been potentially infected with malicious software.

In some embodiments, the notification is provided to the primary system in response to receiving from an analysis system a notification that a backup snapshot may be potentially infected with malicious software.

At 704, a selection of a backup snapshot is received. A user may select a clean backup snapshot to restore the primary system to a safe state or select a clean version of a content file to restore the content file to a safe state.

At 706, the selected backup snapshot is restored. Upon receiving a selection from the user, the storage cluster may be configured to restore the file and/or the primary system to the state associated with the selected clean backup snapshot or clean file version. The storage cluster may provide the data chunks associated with the selected clean backup snapshot or clean file version.

Figure 8:
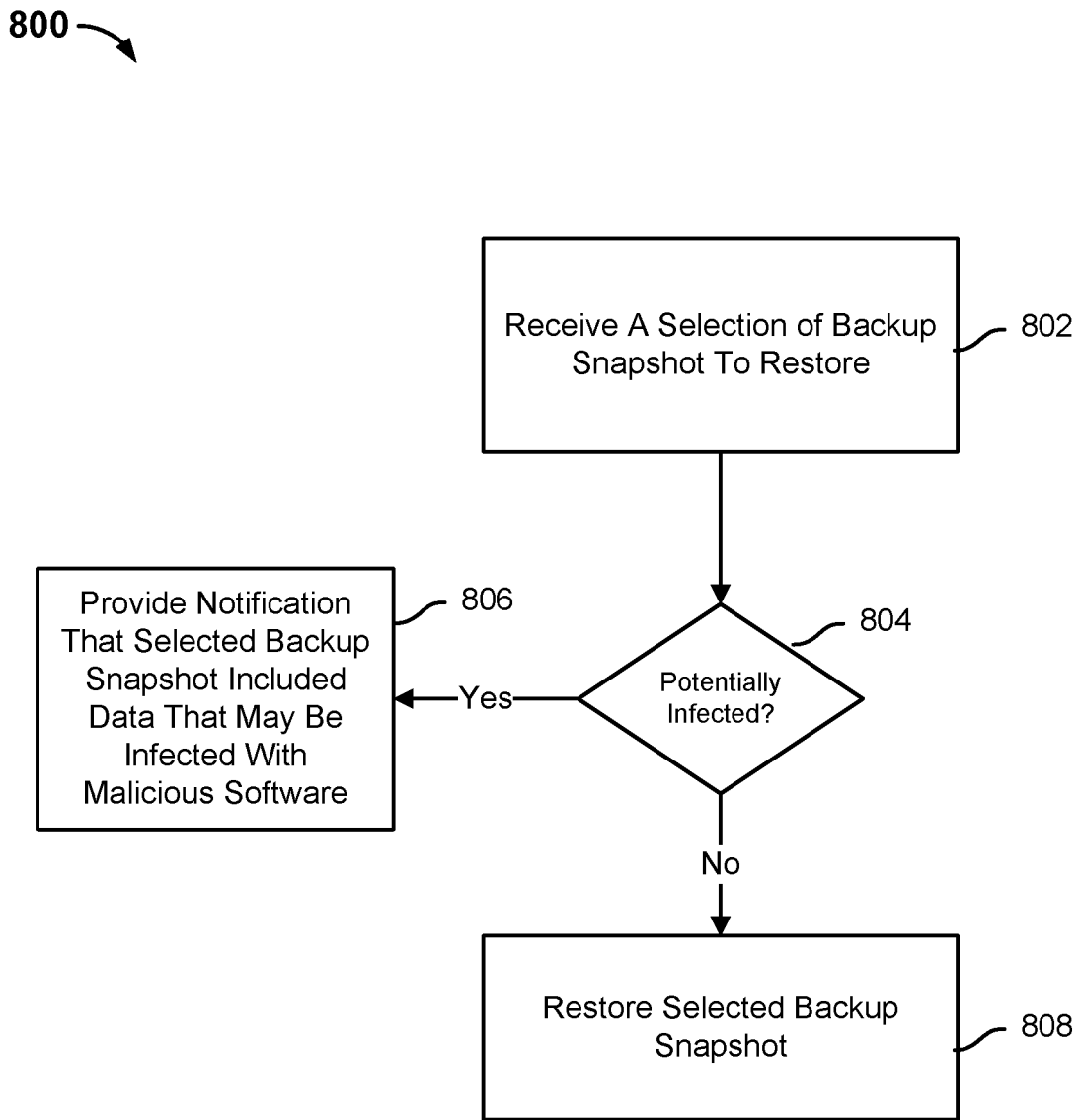
FIG. 8 is a flow chart illustrating a process for restoring a primary system in accordance with some embodiments.

FIG. 8 is a flow chart illustrating a process for restoring a primary system in accordance with some embodiments. In the example shown, process 800 may be implemented by a storage cluster, such as storage cluster 112.

At 802, a selection of a backup snapshot to restore to a destination is received. A primary system may become corrupted. A backup snapshot may represent the state of a primary system at a particular moment in time. A storage cluster associated with the primary system may provide a backup snapshot to the primary system to restore the primary system to the state at the particular moment in time.

At 804, it is determined whether the selected backup snapshot has been potentially infected with malicious software.

In some embodiments, the storage cluster includes a data structure that indicates whether a backup snapshot has been potentially infected with malicious software. The data structure may be inspected to determine whether the selected backup snapshot has been potentially infected with malicious software.

In other embodiments, the selected backup snapshot is analyzed and compared to previous versions of the backup snapshot. Files included in the selected backup snapshot and portions of files included in the selected backup snapshot may be analyzed to determine whether a file, a portion of the file, and by extension the backup snapshot have been potentially infected with malicious software.

In the event the selected backup snapshot is determined to have been potentially infected with malicious software, process 800 proceeds to 806. In the event the selected backup snapshot is determined not to have been potentially infected with malicious software, process 800 proceeds to 808.

At 806, a notification that the selected backup snapshot includes data that may be infected with malicious software is provided. In some embodiments, the notification includes a set of alternative backup snapshots that are known to be clean backup snapshots and the user may decide to restore one of the clean backup snapshots. In other embodiments, a user may still elect to restore the selected backup snapshot in light of the notification and the selected backup snapshot is restored.

At 808, the selected backup snapshot is restored to the destination. The data chunks associated with the backup snapshot may be provided from the storage cluster to the destination, e.g., the primary system.

Figure 9:
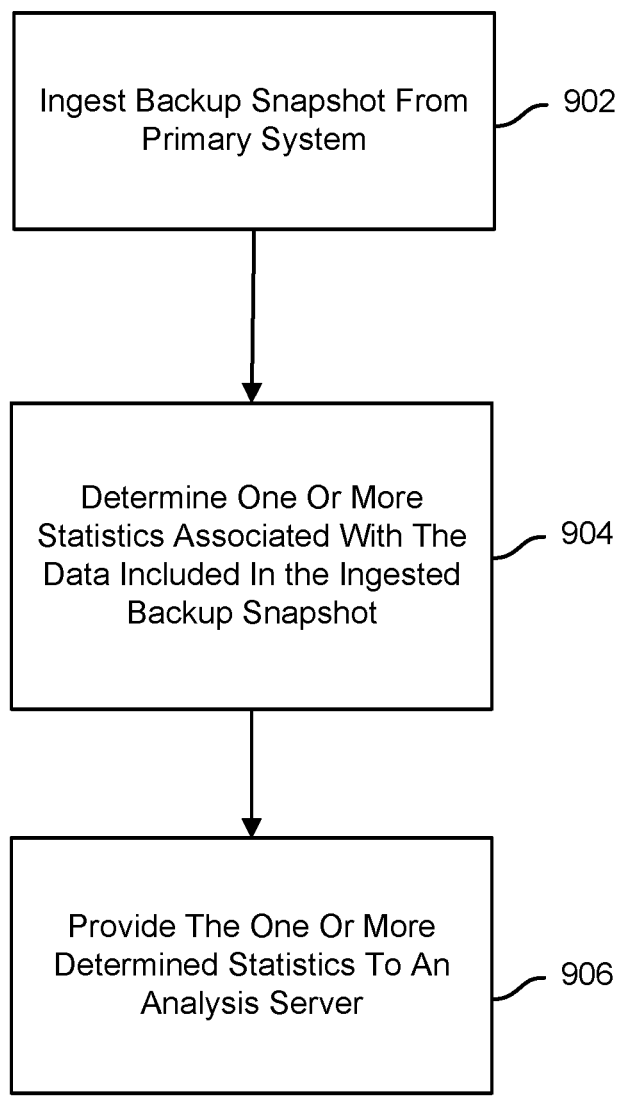
FIG. 9 is a flow chart illustrating a process for determining one or more statistics associated with a backup snapshot in accordance with some embodiments.

FIG. 9 is a flow chart illustrating a process for determining statistics associated with a backup snapshot in accordance with some embodiments. In the example shown, process 900 may be implemented by a storage cluster, such as storage cluster 112.

At 902, a backup snapshot is ingested from a primary system. A storage cluster may ingest and store the file system data of the backup snapshot across a plurality of storage nodes of the storage cluster.

At 904, one or more statistics associated with the data included in the ingested backup snapshot are determined.

In some embodiments, the one or more statistics associated with the data included in the backup snapshot include the total amount of data that was included in the backup snapshot. Malicious software may encrypt file system data of the primary system. When the primary system performs an incremental backup snapshot, the encrypted file system data may be included in the incremental backup snapshot because they were not previously backed up. Large variations (e.g., greater than a first variation threshold) in the total amount of data that was included in the backup snapshot may indicate that the primary system was potentially infected with malicious software.

In other embodiments, the one or more statistics associated with the data included in the backup snapshot include the total amount of data associated with a particular file included in the backup snapshot. Malicious software may encrypt portions of or an entire file. When the primary system performs an incremental backup snapshot, the encrypted portions of the file may be included in the incremental backup snapshot because they were not previously backed up.

Large variations (e.g., greater than a first variation threshold) in the total amount of data associated with a particular file that was included in the backup snapshot may indicate that the particular file, and by extension the primary system, was potentially infected with malicious software.

In other embodiments, the one or more statistics associated with the data included in the backup snapshot include determining the total amount of deduplication associated with the data included in the backup snapshot. A backup snapshot where a small amount of the data is deduplicated may indicate that the backup snapshot has been potentially infected with malicious software because data that is unable to be deduplicated may indicate that the data is encrypted. When the primary system performs an incremental backup snapshot, the encrypted portions of the file may be included in the incremental backup snapshot because they were not previously backed up. Data that is unable to be deduped because it is encrypted may indicate that the primary system has been potentially infected with malicious software because data that has been infected with malicious software is usually encrypted and unable to be deduped.

In other embodiments, the one or more statistics associated with the data included in the backup snapshot include determining the amount of deduplication associated with a file included in the backup snapshot. A file may undergo a large amount of change since a previous backup snapshot. The portions of the file that have changed may be analyzed to determine whether deduplication has occurred with respect to the changed portion. Data that is unable to be deduped because it is encrypted may indicate that the file, and by extension the primary system, has been potentially infected with malicious software because data that has been infected with malicious software is usually encrypted and unable to be deduped.

In other embodiments, the one or more statistics associated with the data included in the backup snapshot include a number of files included in the backup snapshot that were added, deleted, and/or modified. The number of files included in the backup snapshot that were added, deleted, and/or modified may be compared to a change threshold. In the event the number of files included in the backup snapshot that were added, deleted, and/or modified is greater than the change threshold, the changed files associated with the backup snapshot may be determined to have been potentially infected with malicious software.

In other embodiments, the one or more statistics associated with the data included in the backup snapshot include an entropy of the changed data. The entropy of the changed data may be a measure of randomness associated with a file. An amount of compression associated with a file may be used to indirectly measure the entropy of the changed data associated with the file. In some embodiments, for systems that maintain fine-grained pre/post compression and pre/post deduplication statistics, entropy may be inferred from fine-grained pre/post compression and pre/post deduplication statistics. In some embodiments, for systems that do not maintain fine-grained pre/post compression and pre/post deduplication statistics, entropy may be inferred from compression statistics associated with a sample of the data chunks associated with the changed data. Compression statistics associated with a sample of the data chunks of the changed data may be determined. Unique data chunks (e.g., non-deduped data chunks) may be sampled. The unique data chunks of the changed data may be randomly sampled or sampled using one or more different sampling techniques. In the event the sampled changed data compresses more than a compression threshold, the changed data associated with the file may be determined to be less random, which indicates the entropy of the changed data is small (e.g., less than an entropy threshold). In the event the sampled changed data compresses less than the compression threshold, i.e., the entropy of the changed data associated with a file is greater than an entropy threshold, the file may be determined to have been potentially infected with malicious software.

At 906, the one or more determined statistics are provided to an analysis server. The one or more statistics associated with the backup snapshot may be provided from the storage cluster to an analysis server associated with a cloud service system that is hosted in a cloud environment. The analysis server may be configured to determine whether a backup snapshot has been potentially infected with malicious software based on the one or more determined statistics.

Figure 10:
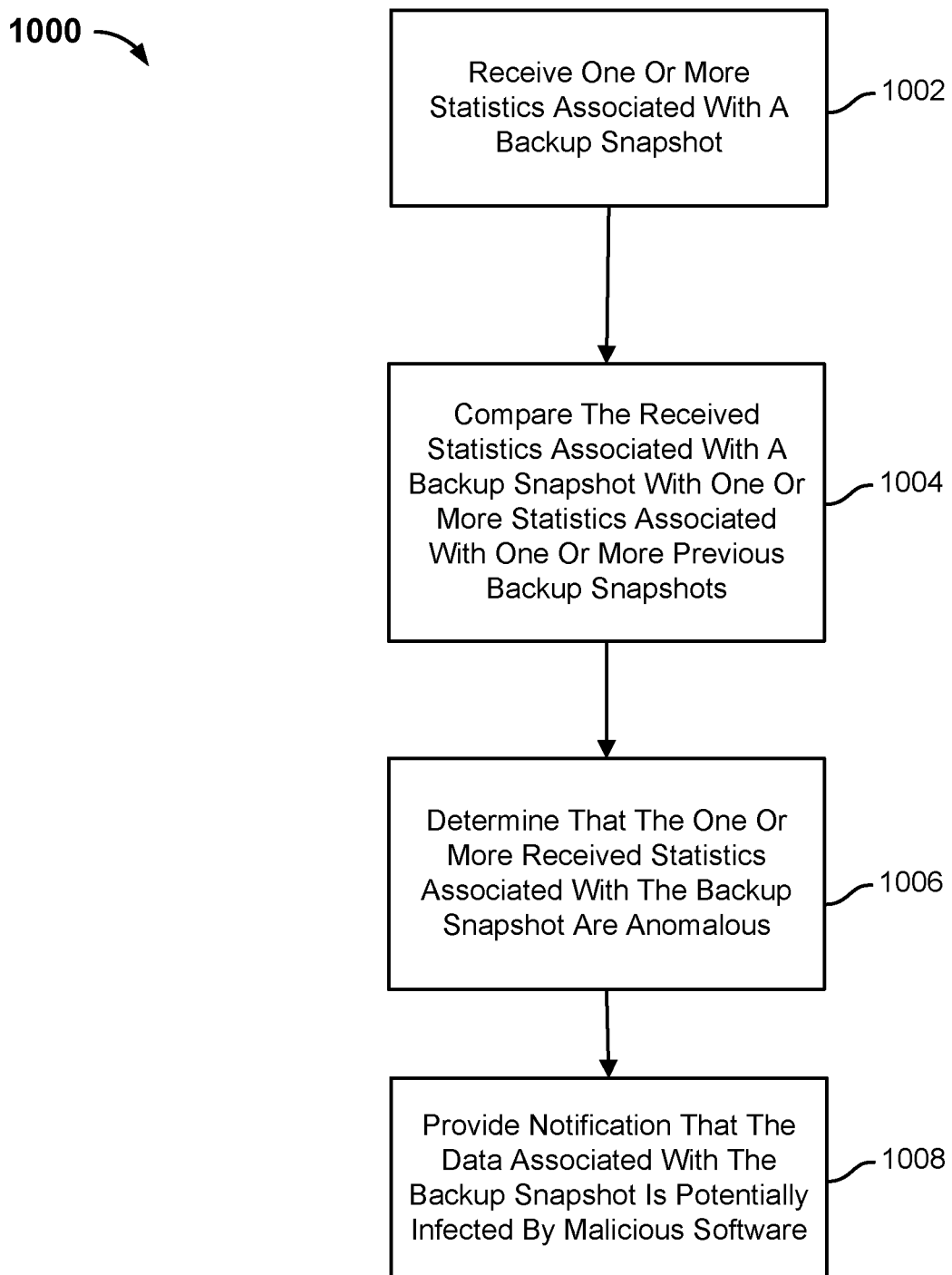
FIG. 10 is a flow chart illustrating a process for detecting malicious software in accordance with some embodiments.

FIG. 10 is a flow chart illustrating a process for detecting malicious software in accordance with some embodiments. In the example shown, process 1000 may be implemented by an analysis server, such as analysis server 172.

At 1002, one or more statistics associated with a backup snapshot are received. The one or more statistics associated with the backup snapshot may be provided from the storage cluster to an analysis server associated with a cloud service system that is hosted in a cloud environment.

At 1004, the received statistics associated with the backup snapshot are compared to statistics associated with one or more previous backup snapshots.

In some embodiments, the total amount of data change for the backup snapshot may be compared to the rate of data change associated with one or more previous backup snapshots. The rate of data change per backup snapshot may indicate whether the backup snapshot has been infected with malicious software because a primary system that has been infected with malicious software is likely to have a large amount of data change per incremental backup snapshot.

In some embodiments, the analysis server is configured to determine whether a backup snapshot has been potentially infected with malicious software based on the rate of data change of a particular file per backup snapshot. The total amount of data change of a particular file for the backup snapshot may be compared to the rate of data change for the particular file associated with one or more previous backup snapshots. The rate of data change per backup snapshot may indicate whether the particular file, and by extension the primary system, has been infected with malicious software because a file that has been infected with malicious software is likely to have a large amount of data change per incremental backup snapshot.

In other embodiments, the analysis server is configured to determine whether a backup snapshot has been potentially infected with malicious software based on an amount of deduplication associated with the backup snapshot. A large amount of deduplication (e.g., greater than a first deduplication threshold) may indicate that the primary system has not been infected with malicious software because deduplication is possible. File system data that is encrypted because of malicious software may be less likely to be deduped. A small amount of deduplication data (e.g., less than a second deduplication threshold) may indicate that the primary system has been potentially infected with malicious software because a large portion of the file system data is unable to be deduped.

In other embodiments, the analysis server is configured to determine whether a backup snapshot has been potentially infected with malicious software based on an amount of deduplication associated with a file included in the backup snapshot.

In other embodiments, the analysis server is configured to determine whether a backup snapshot has been potentially infected with malicious software based on the rate at which particular portions of a file have changed over a plurality of backup snapshots.

In some embodiments, the analysis server is configured to determine whether data included in the backup snapshot has been potentially infected with malicious software based on the number of files included in the backup snapshot that were added, deleted, and/or modified. In some embodiments, the analysis server is configured to determine whether data included in the backup snapshot has been potentially infected with malicious software based on an entropy of the changed data.

At 1006, it is determined that the received statistics associated with the backup snapshot are anomalous.

The rate at which the data associated with an incremental backup snapshot has changed may be compared to a historical rate (e.g., average, moving average) at which the data associated with an incremental backup snapshot has changed. The average rate of change per backup snapshot for the file may be determined. In the event the rate of change for a particular backup snapshot is greater than the historical rate of change per backup snapshot by a threshold (e.g., certain amount, certain percentage, more than one standard deviation, any other statistical measure), the backup snapshot may be indicated as being potentially infected by malicious software.

The rate at which the data associated with a file has changed for a backup snapshot may be compared to a historical rate (e.g., average, moving average) at which the data associated with the file has changed. For example, the amount of change associated with a file may fluctuate at any time of the year. The average rate of change per backup snapshot for the file may be determined. The rate at which the file has changed for a particular backup snapshot may be compared to the average rate of change per backup snapshot. In the event the rate at which the data associated with the file has changed for a particular backup snapshot is greater than the historical rate of change for the file per backup snapshot by a threshold (e.g., certain amount, certain percentage, more than one standard deviation, any other statistical measure), the file may be indicated as being potentially infected by malicious software.

In other embodiments, an amount of deduplication associated with the backup snapshot may be compared to one or more deduplication thresholds. A large amount of deduplication (e.g., greater than a first deduplication threshold) may indicate that the primary system has not been infected with malicious software because deduplication is possible. File system data that is encrypted because of malicious software may be less likely to be deduped. A small amount of deduplication (e.g., less than a second deduplication threshold) may indicate that the primary system has been potentially infected with malicious software because a large portion of the file system data is unable to be deduped. In the event the amount of deduplication associated with the backup snapshot is less than or equal to the second deduplication threshold, the backup snapshot may be indicated as being potentially infected with malicious software.

In other embodiments, an amount of deduplication associated with a file included in the backup snapshot may be compared to one or more file deduplication thresholds. A large amount of deduplication (e.g., greater than a first file deduplication threshold) may indicate that the file has not been infected with malicious software because deduplication is possible. A file that is encrypted because of malicious software may be less likely to be deduped. A small amount of deduplication (e.g., less than a second file deduplication threshold) may indicate that the file has been potentially infected with malicious software because a large portion of the file is unable to be deduped. In the event the amount of deduplication associated with the backup snapshot is less than or equal to the second deduplication threshold, the file may be indicated as being potentially infected with malicious software.

In other embodiments, a backup snapshot may be determined to have been potentially infected with malicious software based on the rate at which particular portions of a file have changed over a plurality of backup snapshots. The rate at which the data associated with a particular portion of a file has changed for a backup snapshot may be compared to a historical rate (e.g., average, moving average) at which the data associated with the particular portion of the file has changed. The average rate of change per backup snapshot for the particular portion of the file may be determined. The rate at which the particular portion of the file has changed for a particular backup snapshot may be compared to the average rate of change for the particular portion of the file per backup snapshot. In the event the rate at which the data associated with the particular portion of the file has changed for a particular backup snapshot is greater than the historical rate of change for the particular portion of the file per backup snapshot by a threshold (e.g., certain amount, certain percentage, more than one standard deviation, any other statistical measure), the file may be indicated as being potentially infected by malicious software.

In other embodiments, in the event the number of files included in the backup snapshot that were added, deleted, and/or modified is greater than the change threshold, the changed files associated with the backup snapshot are determined to have been potentially infected with malicious software.

In other embodiments, in the event the entropy of the changed data associated with a file is greater than an entropy threshold, the file is determined to have been potentially infected with malicious software.

Other factors, such as historical trends and seasonality may be taken into consideration before determining that a file and/or a primary system may have been infected with malicious software.

Using a single statistic associated with the data included in a backup snapshot to determine whether a file stored on the primary system or the actual primary system is potentially infected with malicious software may lead to a plurality of false positives (e.g., determine the file or the primary system is potentially infected with malicious software when the file or the primary system is not infected with malicious software). The number of false positives detected by the analysis server may be reduced by using a plurality of the statistics associated with the backup snapshot. For example, an amount of deduplication associated with a backup snapshot may be determined. In the event the amount of deduplication associated with the backup snapshot is greater than a deduplication threshold, the number of files included in a backup snapshot that were added, deleted, or modified may be determined. In the event the number of files included in a backup snapshot that were added, deleted, or modified is greater than a change threshold, an entropy of the changed data associated with the files included in the backup snapshot may be determined. In the event the entropy of the changed data associated with the files included in the backup snapshot is greater than an entropy threshold, one or more files included in the backup snapshot may be determined to be potentially infected with malicious software.

At 1008, a notification that the data associated with the backup snapshot is potentially infected by malicious software is provided. In some embodiments, the notification is provided to a storage cluster storing the backup snapshot. In other embodiments, the notification is provided to a primary system that generated the backup snapshot.

Figure 11:
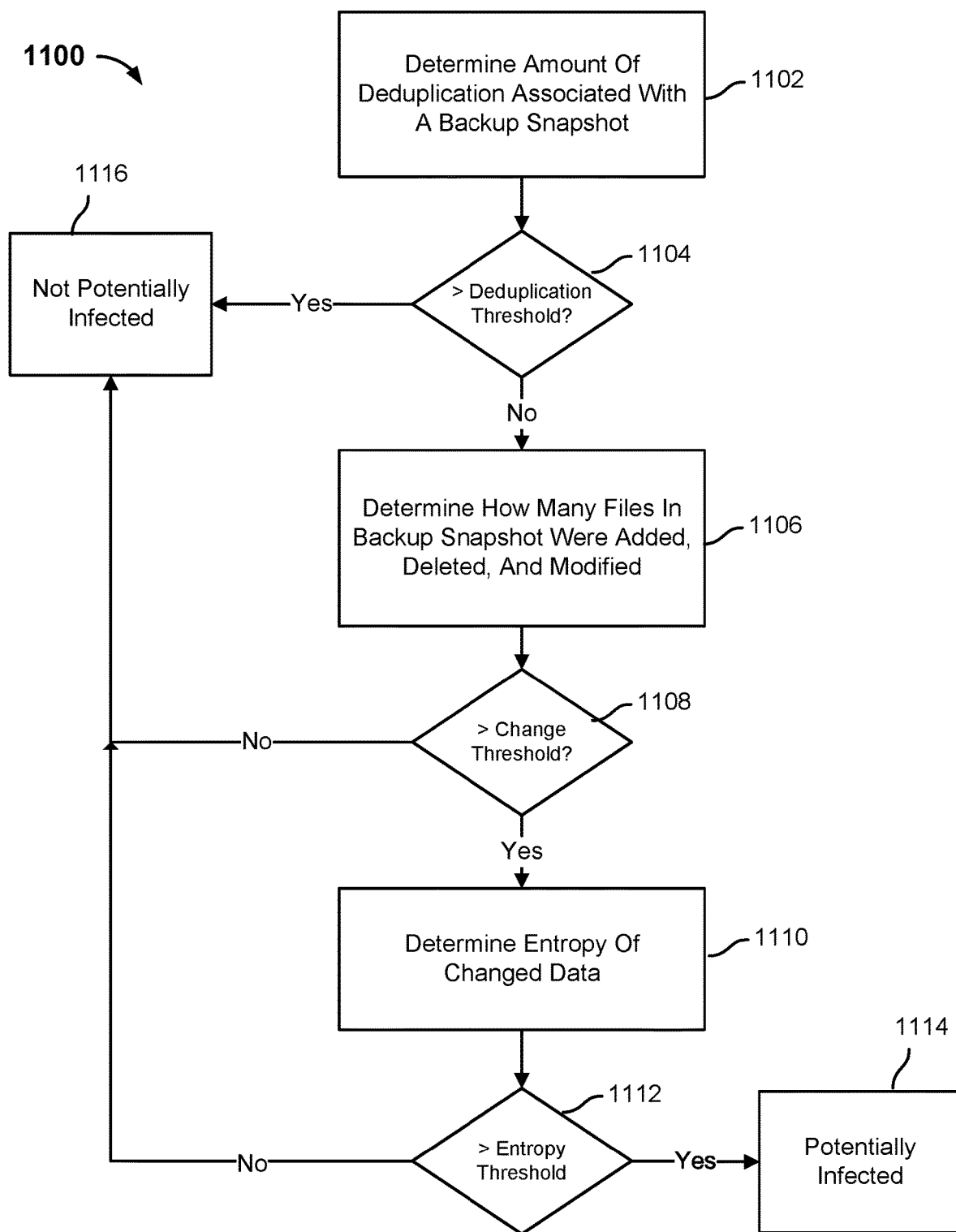
FIG. 11 is a flow chart illustrating a process for detecting false positives in accordance with some embodiments.

FIG. 11 is a flow chart illustrating an embodiment of a process for reducing the detection of false positives. In some embodiments, process 1100 is implemented by an analysis server, such as analysis server 172. In other embodiments, process 1100 is implemented by a storage cluster, such as storage cluster 112. Process 1100 may be implemented to perform some or all of step 506 of process 500 or some or all of step 1006 of process 1000.

At 1102, an amount of deduplication associated with a backup snapshot is determined. A large amount of deduplication may indicate that the file has not been infected with malicious software because deduplication is possible. A file that is encrypted because of malicious software may be less likely to be deduped. A small amount of deduplication may indicate that the file has been potentially infected with malicious software because a large portion of the file is unable to be deduped.

At 1104, it is determined whether the amount of deduplication associated with a backup snapshot is greater than a deduplication threshold. In the event the amount of deduplication associated with a backup snapshot is not greater than a deduplication threshold, process 1100 proceeds to 1106. In the event the amount of deduplication associated with a backup snapshot is greater than a deduplication threshold, process 1100 proceeds to 1116 and the backup snapshot is determined not to be potentially infected with malicious software.

At 1106, the number of files in a backup snapshot that were added, deleted, and/or modified are determined. At 1108, it is determined whether the number of files in a backup snapshot that were added, deleted, and/or modified is greater than a change threshold. In the event the number of files in a backup snapshot that were added, deleted, and/or modified is greater than a change threshold, process 1100 proceeds to 1110. In the event the number of files in a backup snapshot that were added, deleted, and/or modified is not greater than a change threshold, process 1100 proceeds to 1116 and the backup snapshot is determined not to be potentially infected with malicious software.

At 1110, an amount of entropy associated with the changed data is determined. The entropy of the changed data may be a measure of randomness associated with a file. An amount of compression associated with a file may be used to indirectly measure the entropy of the changed data associated with the file. In some embodiments, for systems that maintain fine-grained pre/post compression and pre/post deduplication statistics, entropy may be inferred from fine-grained pre/post compression and pre/post deduplication statistics. In some embodiments, for systems that do not maintain fine-grained pre/post compression and pre/post deduplication statistics, entropy may be inferred from compression statistics associated with a sample of the data chunks associated with the changed data. Compression statistics associated with a sample of the data chunks of the changed data may be determined. The data chunks of the changed data may be randomly sampled or sampled using one or more different sampling techniques.

At 1112, it is determined whether the amount of entropy associated with the changed data is greater than an entropy threshold. In the event the amount of entropy associated with the changed data is not greater than an entropy threshold (e.g., the sampled changed data compresses more than a compression threshold), process 1100 proceeds to 1116 and the backup snapshot is determined not to be potentially infected with malicious software. In the event the amount of entropy associated with the changed data is greater than an entropy threshold (e.g., the sampled changed data compresses less than the compression threshold), process 1100 proceeds to 1114 and the backup snapshot is determined to be potentially infected with malicious software.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a processor configured to:
receive an incremental backup snapshot that includes data associated with a version of a content file;
determine, by a processor of a storage cluster, an amount of data change associated with the version of the content file included in the incremental backup snapshot with respect to one or more previous versions of the content file, wherein the incremental backup snapshot includes data associated with a primary system, wherein the data associated with the primary system is backed up from the primary system to the storage cluster, wherein the amount of data change associated with the version of the content file is determined using a tree data structure associated with the content file that is stored on the storage cluster;
provide to a server one or more statistics associated with the incremental backup snapshot, wherein the one or more statistics associated with the incremental backup snapshot include a total amount of deduplication associated with the data included in the incremental backup snapshot, wherein the server is configured to determine that the amount of data change associated with the version of the content file is anomalous based in part on the one or more statistics associated with the incremental backup snapshot, wherein the server is configured to determine that the amount of data change associated with the version of the content file is anomalous in the event the total amount of deduplication associated with the data included in the incremental backup snapshot is less than a deduplication threshold, wherein an anomalous amount of data change associated with the version of the content file indicates that the data associated with the incremental backup snapshot is potentially infected by malicious software;
receive from the server a notification that data associated with the incremental backup snapshot is potentially infected by malicious software; and identify the version of the content file as being potentially infected by malicious software; and a memory coupled to the processor and configured to provide the processor with instructions.

2. The system of claim 1, wherein the content file is a virtual machine container file.

3. The system of claim 1, wherein the processor is further configured to provide to the primary system a notification that the primary system is potentially infected with malicious software, wherein the notification includes a link to a set of clean versions of the content file.

4. The system of claim 3, wherein the processor is further configured to:
receive a selection of a clean version of the content file that is included in the set of clean versions of the content file; and
restore the clean version of the content file to the primary system.

5. The system of claim 1, wherein the processor is further configured to provide to the primary system a notification that the primary system is potentially infected with malicious software, wherein the notification includes a link to a set of clean backup snapshots that include corresponding clean versions of the content file.

6. The system of claim 5, wherein the processor is further configured to:
receive a selection of a clean backup snapshot that is included in the set of clean backup snapshots; and
restore the clean backup snapshot to the primary system.

7. The system of claim 1, wherein to determine the amount of data change associated with the version of the content file stored on the storage cluster with respect to the one or more previous versions of the content file, the processor is further configured to:
traverse the tree data structure corresponding to the version of the content file;
traverse one or more tree data structures corresponding to the one or more previous versions of the content file;
determine a first amount of data change associated with the version of the content file based on a traversal of the tree data structure corresponding to the version of the content file; and
determine corresponding amounts of data change associated with the one or more previous versions of the content file based on corresponding traversals of the one or more tree data structures corresponding to the one or more previous versions of the content file.

8. The system of claim 1, wherein the amount of data change associated with the version of the content file is determined to be anomalous in the event the amount of data change associated with the content file is greater than a rate of change per backup snapshot by a threshold.

9. The system of claim 8, wherein the rate of change per backup snapshot is a historical rate of change, a seasonality rate of change, or a trending rate of change.

10. The system of claim 8, wherein the determined amount of data change associated with the version of the content file includes an amount associated with a sub-portion of the content file.

11. The system of claim 10, wherein the processor is configured to determine that the amount of data change associated with the version of the content file is anomalous in the event the sub-portion amount of the content file is greater than a rate of change for the sub-portion of the content file per backup snapshot by a threshold.

12. The system of claim 1, wherein a retention policy associated with the content file is placed on hold.

13. The system of claim 1, wherein the processor is configured to:
receive a selection of a backup snapshot to restore to the primary system; and
provide a notification that the backup snapshot is potentially infected by malicious software.

14. The system of claim 1, where a portion of the data change associated with the version of the content file is encrypted.

15. The system of claim 1, wherein the server is configured to determine that the amount of data change associated with the version of the content file is anomalous based on a plurality of statistics associated with the backup snapshot that includes the version of the content file.

16. The system of claim 15, wherein the plurality of statistics at least include a number of files associated with the backup snapshot that were added, deleted, or modified, and an entropy value associated with changed data included in the backup snapshot.

17. A method, comprising:
receiving an incremental backup snapshot that includes data associated with a version of a content file;
determining, by a processor of a storage cluster, an amount of data change associated with the version of the content file included in the incremental backup snapshot with respect to one or more previous versions of the content file, wherein the incremental backup snapshot includes data associated with a primary system, wherein the data associated with the primary system is backed up from the primary system to the storage cluster, wherein the amount of data change associated with the version of the content file is determined using a tree data structure associated with the content file that is stored on the storage cluster;
providing to a server one or more statistics associated with the incremental backup snapshot wherein the one or more statistics associated with the incremental backup snapshot include a total amount of deduplication associated with the data included in the incremental backup snapshot, wherein the server is configured to determine that the amount of data change associated with the version of the content file is anomalous based in part on the one or more statistics associated with the incremental backup snapshot, wherein the server is configured to determine that the amount of data change associated with the version of the content file is anomalous in the event the total amount of deduplication associated with the data included in the incremental backup snapshot is less than a deduplication threshold, wherein an anomalous amount of data change associated with the version of the content file indicates that the data associated with the incremental backup snapshot is potentially infected by malicious software;
receiving from the server a notification that data associated with the incremental backup snapshot is potentially infected by malicious software; and
identifying the version of the content file as being potentially infected by malicious software.

18. The method of claim 17, further comprising:
providing a notification that the primary system is potentially infected with malicious software, wherein the notification includes a link to a set of clean versions of the content file;
receiving a selection of a clean version of the content file that is included in the set of clean versions of the content file; and restoring the clean version of the content file to the primary system.

19. A computer program product, the computer program product being embodied in a non-transitory computer readable storage medium and comprising computer instructions for:
- receiving an incremental backup snapshot that includes data associated with a version of a content file;
- determining an amount of data change associated with the version of the content file included in the incremental backup snapshot with respect to one or more previous versions of the content file, wherein the incremental backup snapshot includes data associated with a primary system, wherein the data associated with the primary system is backed up from the primary system to the storage cluster, wherein the amount of data change associated with the version of the content file is determined using a tree data structure associated with the content file that is stored on a storage cluster;
- providing to a server one or more statistics associated with the incremental backup snapshot wherein the one or more statistics associated with the incremental backup snapshot include a total amount of deduplication associated with the data included in the incremental backup snapshot, wherein the server is configured to determine that the amount of data change associated with the version of the content file is anomalous based in part on the one or more statistics associated with the incremental backup snapshot, wherein the server is configured to determine that the amount of data change associated with the version of the content file is anomalous in the event the total amount of deduplication associated with the data included in the incremental backup snapshot is less than a deduplication threshold, wherein an anomalous amount of data change associated with the version of the content file indicates that the data associated with the incremental backup snapshot is potentially infected by malicious software;
- receiving from the server a notification that data associated with the incremental backup snapshot is potentially infected by malicious software; and
- identifying the version of the content file as being potentially infected by malicious software.

* * * * *